United States Patent
Kaku et al.

(10) Patent No.: US 11,252,104 B2
(45) Date of Patent: Feb. 15, 2022

(54) RELAY APPARATUS

(71) Applicant: DENSO CORPORATION, Kariya (JP)

(72) Inventors: Yoshifumi Kaku, Kariya (JP); Taichi Itagawa, Kariya (JP); Yasuhiro Kotani, Kariya (JP); Kazuya Ohata, Kariya (JP)

(73) Assignee: DENSO CORPORATION, Kariya (JP)

( * ) Notice: Subject to any disclaimer, the term of this patent is extended or adjusted under 35 U.S.C. 154(b) by 43 days.

(21) Appl. No.: 16/802,811

(22) Filed: Feb. 27, 2020

(65) Prior Publication Data
US 2020/0314031 A1 Oct. 1, 2020

(30) Foreign Application Priority Data

Mar. 29, 2019 (JP) .............................. JP2019-068009
Dec. 10, 2019 (JP) .............................. JP2019-222941

(51) Int. Cl.
*H04L 12/935* (2013.01)
*H04L 29/06* (2006.01)

(52) U.S. Cl.
CPC .......... *H04L 49/3009* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2001/0050923 A1* | 12/2001 | Park | H04L 69/40 370/474 |
| 2005/0111451 A1* | 5/2005 | Kim | H04L 1/0061 370/389 |
| 2006/0050702 A1* | 3/2006 | Matsui | H04L 47/2441 370/392 |
| 2007/0065078 A1 | 3/2007 | Jiang | |
| 2009/0310500 A1* | 12/2009 | Matsuda | H04L 43/0864 370/252 |
| 2010/0208691 A1* | 8/2010 | Toyokawa | H04L 69/04 370/331 |
| 2011/0173248 A1* | 7/2011 | Hilt | H04L 69/163 709/203 |
| 2015/0333912 A1* | 11/2015 | Graham-Cumming | H04L 9/12 713/168 |
| 2016/0080068 A1 | 3/2016 | Ishihara et al. | |
| 2017/0048158 A1* | 2/2017 | Park | H04L 47/72 |

(Continued)

*Primary Examiner* — Andre Tacdiran
(74) *Attorney, Agent, or Firm* — Posz Law Group, PLC

(57) ABSTRACT

A relay apparatus relays a frame by connection type communication in which the frame is transmitted and received between communication devices, and includes: communication ports each of which is connected to one of the communication devices; a determiner that receives a reception frame from a communication port among the communication ports, the communication port being connected to a communication device as a frame transmission source among the communication devices, and performs determination of the reception frame by referring a header portion of the reception frame; a rewriter that generates a transmission frame obtained by rewriting the header portion of the reception frame in accordance with a predetermined condition; and a transmitter that transmits the transmission frame from a communication port connected to a communication device as transmission destination among the communication ports.

18 Claims, 21 Drawing Sheets

(56) References Cited

U.S. PATENT DOCUMENTS

| | | |
|---|---|---|
| 2017/0118115 A1 | 4/2017 | Tsuji |
| 2017/0201468 A1* | 7/2017 | Gabbay .................. H04L 49/90 |
| 2020/0162588 A1* | 5/2020 | Kucera .................. H04L 69/22 |

* cited by examiner

| MAC HEADER | IP HEADER | TCP HEADER | UPPER HEADER | PAYLOAD |

| # | LOGICAL ADDRESS | ADDRESS (SUCH AS IP/MAC) |
|---|---|---|
| 1 | 01 | ECU31 |
| 2 | 02 | ECU32 |
| | | |
| | | |

FIG. 12

| PREVIOUS TRANS- MISSION INDEX | ACK INDEX | RECEPTION SeqNum | TRANS- MISSION SeqNum | SeqNum Offset | CORRE- SPONDING TRANS- MISSION AckNum | CORRE- SPONDING RECEPTION AckNum |
|---|---|---|---|---|---|---|
|  |  | 100 | 0 | 120 | 1120 | 1000 |
|  |  | 1120 | 1000 | 140 | 2140 | 2000 |
| V |  | 2140 | 2000 | 160 | 3160 | 3000 |
|  |  |  |  |  |  |  |
|  | V |  |  |  |  |  |

FIG. 13

| PREVIOUS TRANS- MISSION INDEX | ACK INDEX | RECEPTION SeqNum | TRANS- MISSION SeqNum | SeqNum Offset | CORRE- SPONDING TRANS- MISSION AckNum | CORRE- SPONDING RECEPTION AckNum |
|---|---|---|---|---|---|---|
|  | V | 100 | 0 | 120 | 1120 | 1000 |
| V |  | 1120 | 1000 | 140 | 2140 | 2000 |
|  |  |  |  |  |  |  |
|  |  |  |  |  |  |  |
|  |  |  |  |  |  |  |

FIG. 15

| PREVIOUS TRANS- MISSION INDEX | ACK INDEX | RECEPTION SeqNum | TRANS- MISSION SeqNum | SeqNum Offset | CORRE- SPONDING TRANS- MISSION AckNum | CORRE- SPONDING RECEPTION AckNum |
|---|---|---|---|---|---|---|
| | | 100 | 0 | 120 | 1120 | 1000 |
| | | 1120 | 1000 | 140 | 2140 | 2000 |
| V | V | 2140 | 2000 | 160 | 3160 | 3000 |
| | | | | | | |
| | | | | | | |

FIG. 16

| PREVIOUS TRANS- MISSION INDEX | ACK INDEX | RECEPTION SeqNum | TRANS- MISSION SeqNum | SeqNum Offset | CORRE- SPONDING TRANS- MISSION AckNum | CORRE- SPONDING RECEPTION AckNum |
|---|---|---|---|---|---|---|
| | | 100 | 0 | 120 | 1120 | 1000 |
| V | V | 2140 | 1000 | 1140 | 3160 | 2000 |
| | | | | | | |
| | | | | | | |
| | | | | | | |

FIG. 19
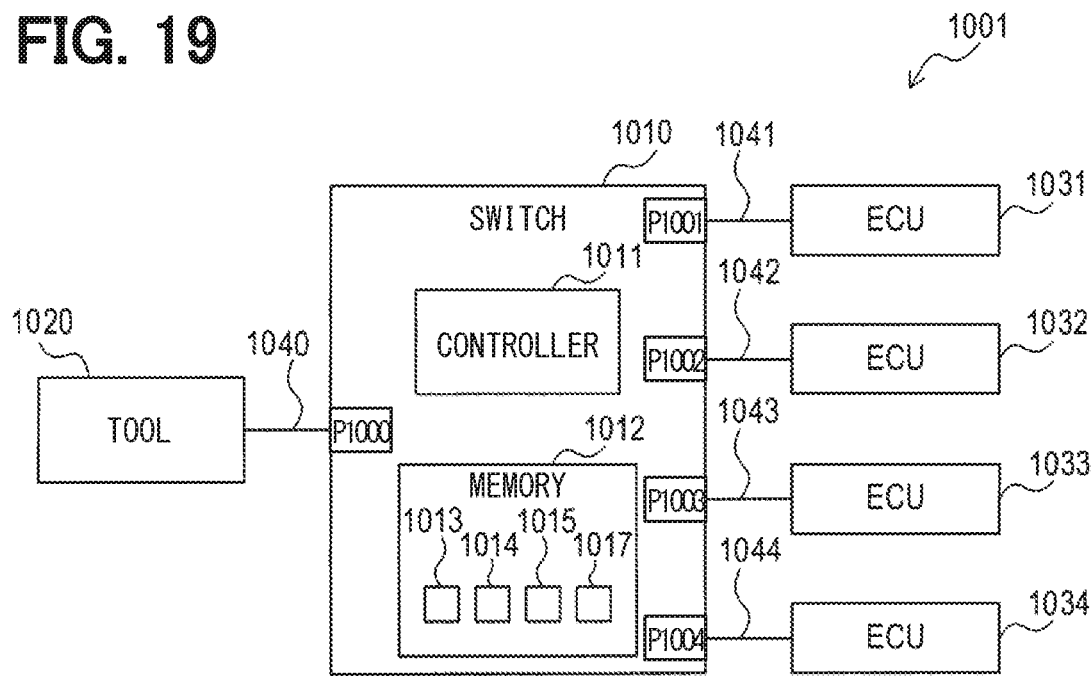
FIG. 20
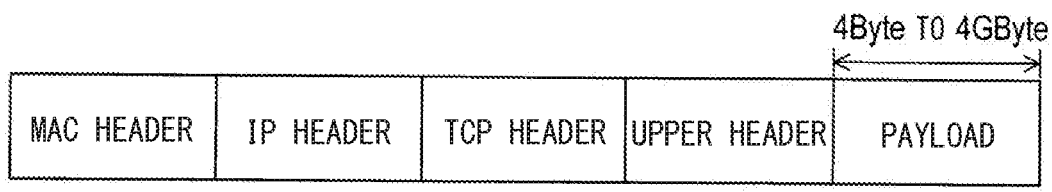
| MAC HEADER | IP HEADER | TCP HEADER | UPPER HEADER | PAYLOAD |
4Byte TO 4GByte
FIG. 21
| # | LOGICAL ADDRESS | ADDRESS (SUCH AS IP/MAC) |
|---|---|---|
| 1 | 01 | ECU1031 |
| 2 | 02 | ECU1032 |
|   |   |   |
|   |   |   |

| HEAD FLAG | END FLAG | PREVIOUS TRANS-MISSION INDEX | ACK INDEX | RECEPTION SeqNum | TRANS-MISSION SeqNum | SeqNum Offset | CORRE-SPONDING TRANS-MISSION AckNum | CORRE-SPONDING RECEPTION AckNum |
|---|---|---|---|---|---|---|---|---|
| v | | | | 100 | 0 | 104 | 1560 | 1456 |
| | | | v | 1560 | 1456 | 104 | 3020 | 2912 |
| | v | v | | 3020 | 2912 | 104 | 4480 | 4368 |

RELAY APPARATUS

CROSS REFERENCE TO RELATED APPLICATIONS

The present application claims the benefit of priority from Japanese Patent Application No. 2019-68009 filed on Mar. 29, 2019 and Japanese Patent Application No. 2019-222941 filed on Dec. 10, 2019. The entire disclosures of the above applications are incorporated herein by reference.

TECHNICAL FIELD

The present disclosure relates to a relay apparatus that relays a frame by a connection type communication that includes transmission or reception between multiple communication devices.

BACKGROUND

A technology that, when relaying a frame by a connection type communication, a relay apparatus establishes connection by the connection type communication between each of communication devices and thereafter relays the frame has been proposed.

SUMMARY

According to one example of the present disclosure, a relay apparatus may relay a frame by connection type communication in which the frame may be transmitted and received between communication devices, and include: communication ports each of which is connected to one of the communication devices; a determiner that may receive a reception frame from a communication port among the communication ports, the communication port being connected to a communication device as a frame transmission source among the communication devices, and may perform determination of the reception frame by referring a header portion of the reception frame; a rewriter that may generate a transmission frame obtained by rewriting the header portion of the reception frame in accordance with a predetermined condition; and a transmitter that may transmit the transmission frame from a communication port connected to a communication device as transmission destination among the communication ports.

BRIEF DESCRIPTION OF DRAWINGS

The features and advantages of the present disclosure will be more clearly understood from the following detailed description with reference to the accompanying drawings. In the drawings:

FIG. 12 is an explanatory diagram showing one example of a sequence ring table immediately after the frame is relayed in the case where the ECU does not receive a part of the frame;

FIG. 13 is an explanatory diagram showing one example of a sequence ring table when the frame is retransmitted in the case where the ECU does not receive a part of the frame;

FIG. 15 is an explanatory diagram showing one example of a sequence ring table in the case where the switch does not receive a part of the ACK;

FIG. 16 is an explanatory diagram showing one example of a sequence ring table for a first ECU;

FIG. 19 is a block diagram showing a configuration of a communication system;

FIG. 20 is an explanatory diagram showing one example of a frame configuration;

FIG. 21 is an explanatory diagram showing one example of a connection tunnel table;

DETAILED DESCRIPTION

Figures 1, 2, 3:
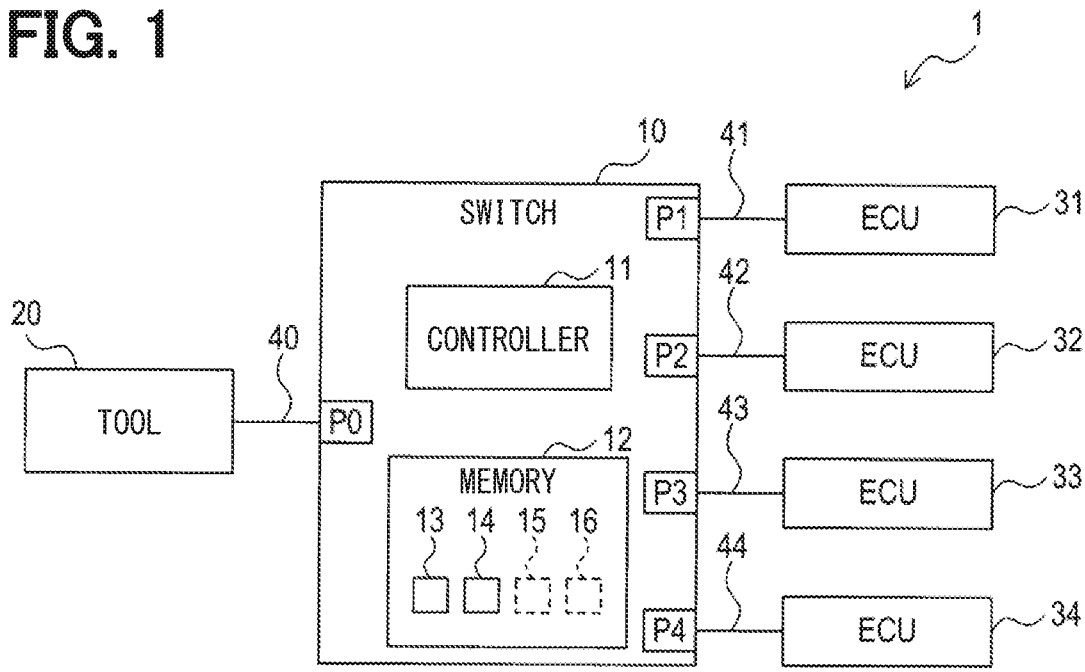
FIG. 1 is a block diagram showing a configuration of a communication system.
FIG. 2 is an explanatory diagram showing one example of a frame configuration.
FIG. 3 is an explanatory diagram showing one example of a connection tunnel table.

A relay apparatus may be required to relay a frame including description by a protocol (hereinafter, also referred to as an upper layer protocol) in an upper layer than a protocol (hereinafter, also referred to as a connection protocol) used for a connection type communication. However, a result of a detail study of the inventors found out a difficulty that the relay apparatus is able to identify a relay destination of the frame by analyzing not only a header portion of the frame but also a payload portion and therefore a process load by the relay apparatus increases.

Furthermore, the result of the detail study of the inventors found out a difficulty that an upper limit value of a data amount that one frame is able to store in the upper layer protocol may be smaller than that in the connection protocol, and it may be not assumed that the relay apparatus relays large data divided in the upper layer protocol and received or transmitted.

One example of the present disclosure is able to reduce the process load by the relay apparatus when relaying the frame including the description by the protocol in the upper layer than the protocol used for the connection type communication.

Another example of the present disclosure is able to reduce the process load by the relay apparatus when relaying the frame including the description by the protocol in the upper layer than the protocol used for the connection type communication and also favorably perform relay of the large data.

According to one example embodiment of the present disclosure, a relay apparatus may relay a frame by connection type communication in which the frame is transmitted and received between multiple communication devices, and include: multiple communication ports each of which is connected to one of the multiple communication devices; a type determiner that may receive a reception frame from a communication port among the multiple communication ports, the communication port being connected to a communication device as a frame transmission source among the multiple communication devices, and determine a type of the reception frame by referring a header portion of the reception frame; a rewriter that may generate a transmission frame obtained by rewriting the header portion of the reception frame in accordance with a predetermined condition when the type of the reception frame corresponds to a predetermined type; and a transmitter that may transmit the transmission frame from a communication port connected to a communication device as transmission destination among the multiple communication ports.

According to such a configuration, when the connection type communication is performed, the type of the reception frame is recognized by referring the header portion of the reception frame, and the transmission frame is generated by only rewriting the header portion. Accordingly, it may be not necessary to execute the process such the analyzing the description by the protocol in the upper layer of the reception frame from the payload. Accordingly, it may be possible to reduce the process load by the relay apparatus when the frame including the description by the protocol in the upper layer than the protocol used for the connection type communication is relayed.

According to another example embodiment of the present disclosure, a relay apparatus may relay a frame by connection type communication in which the frame is transmitted and received between multiple communication devices, and include: multiple communication ports each of which is connected to one of the multiple communication devices; a data determiner that may receive a reception frame from a communication port among the multiple communication ports, the communication port being connected to a communication device as a frame transmission source among the multiple communication devices, and determine whether the reception frame corresponds to division data by referring a header portion of the reception frame, the division data is being obtained by dividing large data corresponding to data to be divided in an upper layer protocol, transmitted, and received; a rewriter that may generate a transmission frame obtained by rewriting the header portion of the reception frame in accordance with a predetermined condition while comparing a data total length indicating large data in the header portion of the reception frame with a data amount of the division data, when the reception frame corresponds to the division data; and a transmitter that may transmit the transmission frame from the communication port connected to a communication device as transmission destination among the multiple communication devices. A protocol performing the connection type communication is set to a connection protocol. A protocol in an upper layer than the connection protocol is set to the upper layer protocol.

According to such a configuration, it may be possible to recognize whether the reception of the large data has been completed by comparing the total data amount with the data amount of the division data without analyzing the payload when relaying the division data obtained by dividing the large data. It may be possible to reduce the process load by the relay apparatus when relaying the frame including the description by the protocol in the upper layer than the protocol used for the connection type communication and also favorably perform the relay of the large data.

Furthermore, according to another example embodiment of the present disclosure, a relay apparatus may relay a frame by connection type communication in which the frame is transmitted and received between multiple communication devices, and include: multiple communication ports each of which is connected to one of the multiple communication devices; a processor that may receive a reception frame from a communication port among the multiple communication ports, the communication port being connected to a communication device as a frame transmission source among the multiple communication devices, perform determination of the reception frame by referring a header portion of the reception frame, generate a transmission frame obtained by rewriting the header portion of the reception frame in accordance with a predetermined condition; and a transmitter that may transmit the transmission frame from a communication port connected to a communication device as transmission destination among the multiple communication ports.

Hereinafter, embodiments of the present disclosure will be described with reference to the drawings.

1. Overview

In an Ethernet (registered trademark) switch (hereinafter, also referred to as a switch) for a vehicle, diagnostics by a DoIP (Diagnostics over Internet Protocol) may be used. An L2 network is prerequisite in the DoIP. Therefore, when connection with a network domain inside a vehicle is performed, it may be necessary that a device (switch or the like) connected to an L2 network outside the vehicle terminates a TCP connection and performs relaying in accordance with data of a TCP payload. Then, the switch establishes the TCP connection with each of the tool and the ECU, and further performs a relay process by an analysis result of the payload. Therefore, there may be a difficulty that a process load of the relay process is extremely large.

Therefore, in the present disclosure, a virtual connection that does not require connection management in the switch is performed. That is, in the switch, the connection tunnel table in which a logical address is associated with a connection destination device is prepared. After the switch receives the TCP data from the tool, a TCP reception process is not performed, and direct transfer to a relay destination ECU is performed in accordance with the connection tunnel table.

Then, there may be a difficulty that, due to the presence or the absence of prior communication, an offset occurs in a sequence number or an ACK number, or a difficulty that, due to a difference of a header size for an upper layer before or after the relay, a cumulative offset occurs in the sequence number or the ACK number. However, in the present disclosure, this offset is calculated, and the sequence number or the ACK number is matched. According to this configuration, it may be possible to implement the virtual connection that causes the ECU or the tool to look as if a connection with the switch has been established even though the switch only performs simple frame conversion and the relay process. Therefore, it may be possible to significantly reduce the process load of the switch.

There may be another difficulty that an upper limit value of a data amount that one frame is able to contain in an upper layer is smaller than that in a lower layer. In details, even when data has the amount that can be transmitted by one frame in a TCP corresponding to the lower layer, the data may be required to be divided in advance into multiple frames in the DoIP corresponding to the upper layer. As described above, when it is not assumed that the switch relays the large data divided in the upper layer and transmitted or received, it may be necessary that the payload is analyzed and relayed.

Therefore, the switch of the present disclosure receives a reception frame has a header portion that includes a total data amount (hereinafter, also referred to as a data total length) of the large data, refers this header portion, and determines whether the reception frame corresponds to division data. While comparing the data total length with the data amount of the multiple received division data, the reception device recognizes an end point of the division data, and generates a transmission frame obtained by rewriting the header portion of the reception frame in accordance with a predetermined condition.

According to such a configuration, it may be possible to favorably relay the large data.

Hereinafter, details of the configuration described above will be described.

2. First Embodiment

[2-1. Configuration]

According to one aspect of the present disclosure, a communication system 1 corresponds to, for example, a system that includes a main part mounted on a vehicle such as a passenger vehicle and is used for relaying the frame between each of communication devices inside or outside the vehicle.

The communication system 1 shown in FIG. 1 includes a switch 10 corresponding to a relay apparatus. The communication system 1 may include a tool 20, an ECU (Electronic Control Unit) 31, an ECU 32, an ECU 33, and an ECU 34. The switch 10 may include communication ports P0, P1, P2, P3, and P4.

The tool 20 is connected to a communication line 40. The ECU 31 is connected to a communication line 41. The ECU 32 is connected to a communication line 42. The ECU 33 is connected to a communication line 43. The ECU 34 is connected to a communication line 44. Each of the tool 20, the ECU 31, the ECU 32, the ECU 33, and the ECU 34 configures a communication device communicating with each other via the communication lines 40 to 44 and the switch 10.

The five communication lines 40 to 44 are connected in order to the communication ports P0 to P4. That is, the tool 20 is connected to the communication port P0 via the communication line 40. The ECU 31 is connected to the communication port P1 via the communication line 41. The ECU 32 is connected to the communication port P2 via the communication line 42. The ECU 33 is connected to the communication port P3 via the communication line 43. The ECU 34 is connected to the communication port P4 via the communication line 44. The communication ports P0 to P4 function as a transceiver transmitting and receiving the frame. The switch 10 is configured as an Ethernet (registered trademark) switch corresponding to a gateway. The switch 10 performs communication by using a protocol such as, for example, a DoIP (Diagnostics over Internet Protocol), the Ethernet, and a TCP (Transmission Control Protocol). The switch 10 relays the frame while filtering the frame among the communication lines 40 to 44.

The switch 10 is configured as, for example, as a hardware including a circuit such as a semiconductor device or the like. The switch 10 further includes a controller 11 and a memory 12. The controller 11 manages overall relaying of the frame. The controller 11 is configured as, for example, an integration circuit, a microcomputer, or the like. The memory 12 corresponds to, for example, a volatile memory. However, the memory 12 may correspond to a rewritable nonvolatile memory.

For example, the controller 11 selects relaying of the received frame or discarding of the received frame in accordance with a filtering rule prepared in advance, and performs the selected one. Operation of the switch 10 corresponds to operation implemented by the controller 11. Hereinafter, a process executed by the controller 11 will be described as a process executed by the switch 10.

The filtering rule corresponds to a rule for determining a process of relaying the frame, a process of discarding the frame, or the like in accordance with a frame characteristic such as an address, a frame format, a data length of the frame, or a class of the frame in the received frame. Here, the frame communicated in the communication system 1 corresponds to, for example, a frame as shown in FIG. 2. This frame is generated by an application handling a protocol of a filth layer or more in an OSI reference model. This frame includes a TCP header for performing communication in the TCP corresponding to a protocol of a fourth layer in the OSI reference model. In the present embodiment, as the protocol of the fifth layer or more, the DoIP described above or a dedicated protocol for diagnosis is employed.

This frame includes a header portion including a MAC header, an IP header, a TCP header, and an upper header, and a payload portion as actual data. Each of the headers configuring the header portion includes a preamble, a destination address, a transmission source address, a type, or the like. The TCP header includes a sequence number, an ACK number, and various flags in addition to these addresses or the like. The upper header includes data in accordance with the application. For example, the upper header includes a logical address corresponding to the destination address used in the application. The term of "destination" may be also referred to as "BEST" in the drawings. The term of "source" may be also referred to as "SRC" in the drawings.

The memory 12 records a connection tunnel table 13, a sequence number management table 14, and sequence ring tables 15 and 16 described in the third embodiments and subsequent embodiments. The term of "connection" may be also referred to as "CONN" in the drawings.

In the connection tunnel table 13, as shown in FIG. 3, the logical address is associated with the IP address or the MAC address corresponding to the destination address used in the TCP connection. In an example shown in FIG. 3, a logical address of 01 is associated with the IP address or the MAC address of the ECU 31. A logical address of 02 is associated with the IP address or the MAC address of the ECU 32.

The TCP corresponds to a connection protocol of the present disclosure. The DoIP corresponds to an upper layer protocol of the present disclosure. The logical address in the connection tunnel table 13 corresponds to a first address. The IP address or the MAC address in the connection tunnel table 13 corresponds to a second address of the present disclosure.

The sequence number management table 14 corresponds to a table in which contents of the relayed frame are temporarily described. Details of the sequence number management table 14 will be described later. The tool 20 is connectable to and detachable from the communication line 40. The tool 20 is connected to the switch 10 via the communication line 40 as needed at the time of vehicle inspection or the like. The tool 20 corresponds to a device that communicates with one ECU or multiple ECUs among the ECUs 31 to 34 set in advance, thereby reads out information such as diagnosis recorded in the memories of these ECUs 31 to 34, and performs vehicle diagnosis based on the read out information when tool 20 is connected to the switch 10 via the communication line 40. The tool 20 has a function of rewriting a program stored in the ECUs 31 to 34 by transmitting the frame to the ECUs 31 to 34.

The ECUs 31 to 34 correspond to an electronic control unit having a function of controlling a configuration element of the vehicle such as an engine, an air conditioner, or an audio, and additionally has a communication function of communicating the frame described above.

[2-2. Process]

Figure 4:
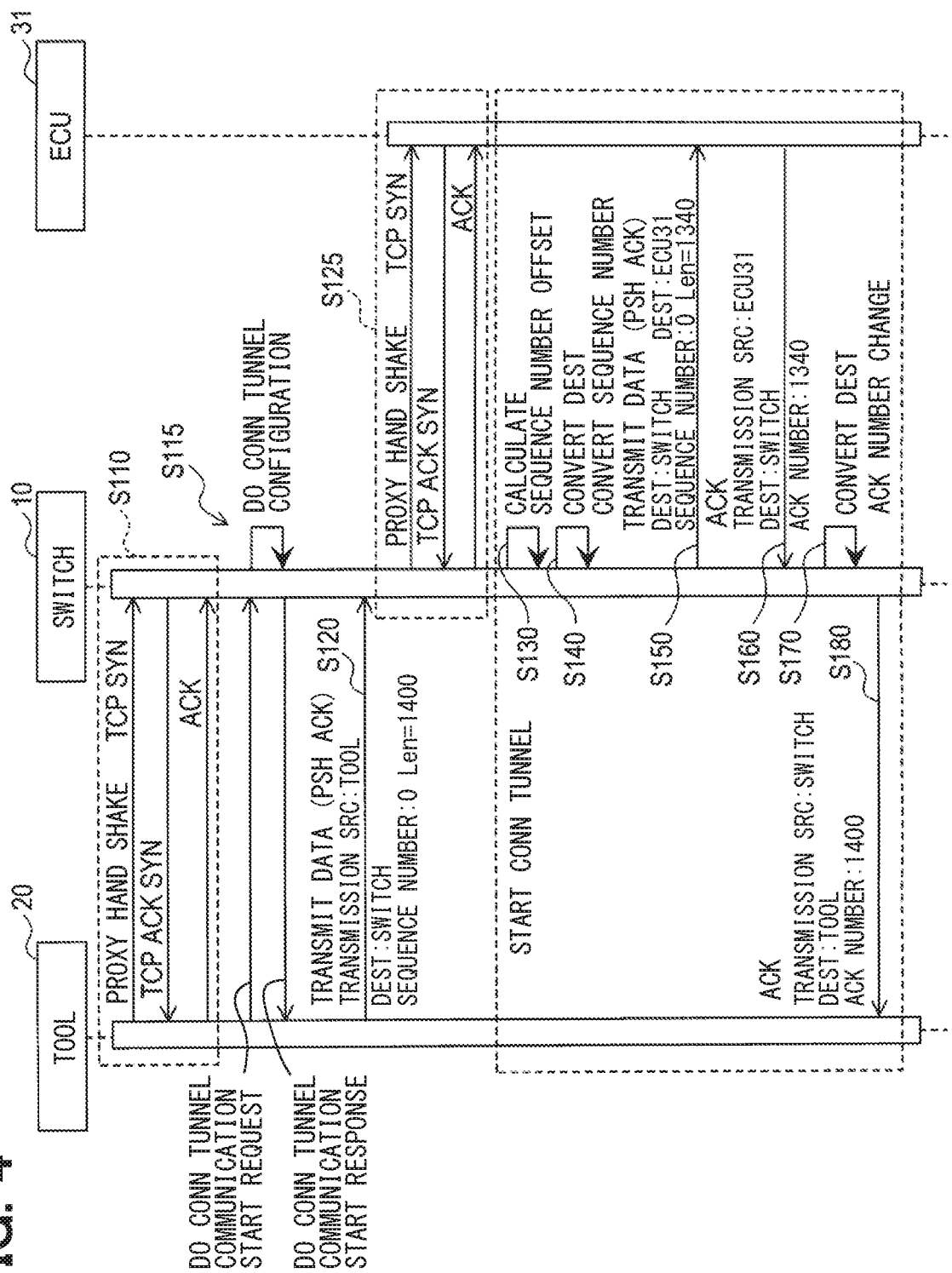
FIG. 4 is a sequence diagram showing an example of a process in which a frame is transmitted to an ECU from a switch via a tool in a first embodiment.

Next, one example of a process in which the switch 10 and the ECU 31 exchange the frame via the tool 20 will be described with reference to a sequence diagram of FIG. 4. Hereinafter, a configuration performed by the controller 11 of the switch 10 will be mainly described.

When the tool 20 transmits the frame to the ECU 31, the tool 20 and the switch 10 perform a procedure for exchanging the frame between the tool 20 and the switch 10 in S110. Here, first, handshake for establishing the TCP connection between the tool 20 and the switch 10 is performed.

That is, the switch 10 performs substitute handshake that performs the handshake instead of the ECU 31. Here, as the handshake, three-way handshake performing a TCP SYN, a TCP ACK SYN, and a TCP ACK is employed.

Next, the tool 20 transmits a start request of connection tunnel communication with the switch 10 when the TCP connection with the switch 10 is established. This start request includes the logical address described above as contents of the upper header. The connection tunnel communication indicates communication that recognizes each header portion of the frame, rewrites a part of the header portion, and relays the frame without changing the payload.

Next, the switch 10 receives the start request of the connection tunnel communication in S115, and performs connection tunnel configuration, that is, setting for the connection tunnel communication in S120. As described later in detail, the tool 20 transmits to the switch 10, a frame in which a logical address of the upper header is different from a destination address used in the TCP.

Specifically, the destination address in the TCP indicates the switch 10, and the logical address indicates the ECU 31 or the like. Therefore, the switch 10 is required to rewrite the destination address in the TCP from the switch 10 to the ECU 31 or the like when relaying the frame.

In the configuration of the present embodiment, the connection tunnel table 13 is prepared. Therefore, it may be possible to identify the destination address in accordance with the logical address of the upper header by referring the connection tunnel table 13. That is, the connection tunnel configuration is set as to be capable of rewriting the destination address in the TCP from the switch 10 to the ECU 31 or the like by a simple process when the next frame is received during establishment of the TCP connection, by referring the connection tunnel table 13.

In other words, the switch 10 receives the frame from the ports P0 to P4 connected to the communication device as the frame transmission source, and determines the type of the frame by referring the upper header corresponding to the header portion of this frame. Here, the determination of the frame type may be performed each time when the frame is received. However, in the present embodiment, it will be described that, only when the TCP connection is established, the determination of the frame type is performed and, during the establishment of the TCP connection, the determination of the frame type is omitted.

When the determination of the frame type is omitted, it is assumed that the frame type during the establishment of the TCP connection is same as the frame type recognized, and the following process proceeds. The configuration in which the determination of the frame type is omitted is applied to not only the communication between the switch 10 and the tool 20 but also the communication between the switch 10 and the ECUs 31 to 34.

Hereinafter, operation when the type of the received frame corresponds to a frame by a protocol set in advance such as the DoIP will be described. When the type does not correspond to the protocol set in advance, the normal relaying by the TCP, that is, relaying after the payload is analyzed may be performed.

When the connection tunnel configuration is completed, the switch 10 transmits a response to the start request of the connection tunnel communication to the tool 20. Then, the tool 20 starts to transmit the frame including the actual data to be transmitted to the ECUs 31 to 34 as the destination.

Figure 5:
FIG. 5 is an explanatory diagram showing one example of a data management table.

The switch 10 receives the frame in S120, and manages data by the sequence number management table 14 shown in FIG. 5. That is, the switch 10 describes the transmission source address, the destination address, the TCP flag, and the data length (len) in the sequence number management table 14 in accordance with the header portion of the frame. The switch 10 appropriately performs calculation or the like, and thereby describes the ports P0 to P4 (SRC ports) receiving the frame, the ports P0 to P4 (DIST ports) connected to transmission destination of the frame, the sequence number (SeqNum), the ACK number (AckNum), or the like.

Here, the switch 10 receives the frame from the tool 20. For example, the switch 10 describes, as shown by "1" of the "#" column in FIG. 5, the switch 10 as the destination address, and the tool 20 as the transmission source address, and 1400 bytes as the data length (len) or the like.

Next, in S125, the switch 10 performs the substitute handshake between the ECUs 31 to 34 corresponding to the destination, similarly to the substitute handshake described above. In the present embodiment, a case where the destination is the ECU 31 will be described. Due to this process, the switch 10 becomes in a state where the TCP connection with both of the tool 20 and the ECU 31 is established, in other words, in a state where the connection tunnel can be performed.

Next, in S130, the switch 10 calculates a sequence number offset. The sequence number offset includes an initial offset and a cumulative offset.

Here, in the switch 10, a prior communication corresponding to communication before the actual data is relayed may cause a difference between a communication data amount for the transmission source and a communication data amount for the destination. Here, this difference is calculated as the initial offset described above.

For example, when a difference obtained by subtracting a communication data amount by a prior communication with the destination from a communication data amount by the prior communication with the transmission source is +20 bytes, this difference is set to the initial offset. In this case, when transmitting the frame to the transmission source, the switch 10 adds 20 to the sequence number and the ACK number. When transmitting the frame to the destination, the switch 10 subtracts 20 from the sequence number and the ACK number.

When a data length of a frame from the transmission source is different from a data length of a frame to the destination, for example, when the communication protocol differs depending on the ports P0 to P4, the difference of the data length is calculated as the cumulative offset described above. Here, the data length of the frame from the transmission source is 1400 bytes, and the data length of the frame to the destination is smaller than that of the frame from the transmission source by 60 bytes. Therefore, it is set so that the data length of the frame to the destination is described as 1340 bytes. The initial offset is constant regardless of the number of transmissions of the frame. However, since the cumulative offset increases in proportion to the number of transmissions of the frame, the cumulative offset is added or subtracted every frame transmission.

Next, in S140, the switch 10 performs destination conversion and sequence number conversion. As the destination conversion, as shown by "2" of the "#" column in FIG. 5, the switch 10 changes the destination address from the switch 10 to the ECU 31 and the transmission source address from the tool 20 to the switch 10, in accordance with the connection tunnel configuration. The switch 10 changes the data length from 1400 bytes to 1340 bytes. The sequence number conversion is performed when the necessity of correcting the sequence number occurs.

Next, in S150, the switch 10 transmits the frame on which the destination conversion and sequence number conversion are performed to the ECU 31. When receiving this frame, the ECU 31 returns the ACK to the switch 10. Then, in S160, the switch 10 receives this ACK.

At this time, the frame received by the switch 10 has the destination address of the switch 10, the transmission source address of the ECU 31, and the ACK number of 1340, as shown by "3" of the "#" column in FIG. 5. Next, in S170, the switch 10 performs the destination conversion and ACK number conversion. As the destination conversion, as shown by "4" of the "#" column in FIG. 5, the switch 10 changes the destination address from the switch 10 to the tool 20 and the transmission source address from the ECU 31 to the switch 10, in accordance with the connection tunnel configuration. The switch 10 changes the ACK number from 1340 to 1400.

That is, since the ECU 31 receives the frame having the data length of 1340 bytes, the ECU 31 transmits the ACK number of 1340. However, the tool 20 transmits the frame having the data length of 1400 bytes. Therefore, there is a difference between the ACK number of 1340 and the data length of 1400 bytes. In order to correct the difference, the switch 10 changes the ACK number from 1340 to 1400. The correction amount of the ACK number is similar to the difference of the data length calculated in the S130.

Next, in S180, the switch 10 transmits the ACK on which the destination conversion and the ACK number conversion are performed to the tool 20, In this way, the frame is transmitted from the tool 20 to the ECU 31.

Figure 6:
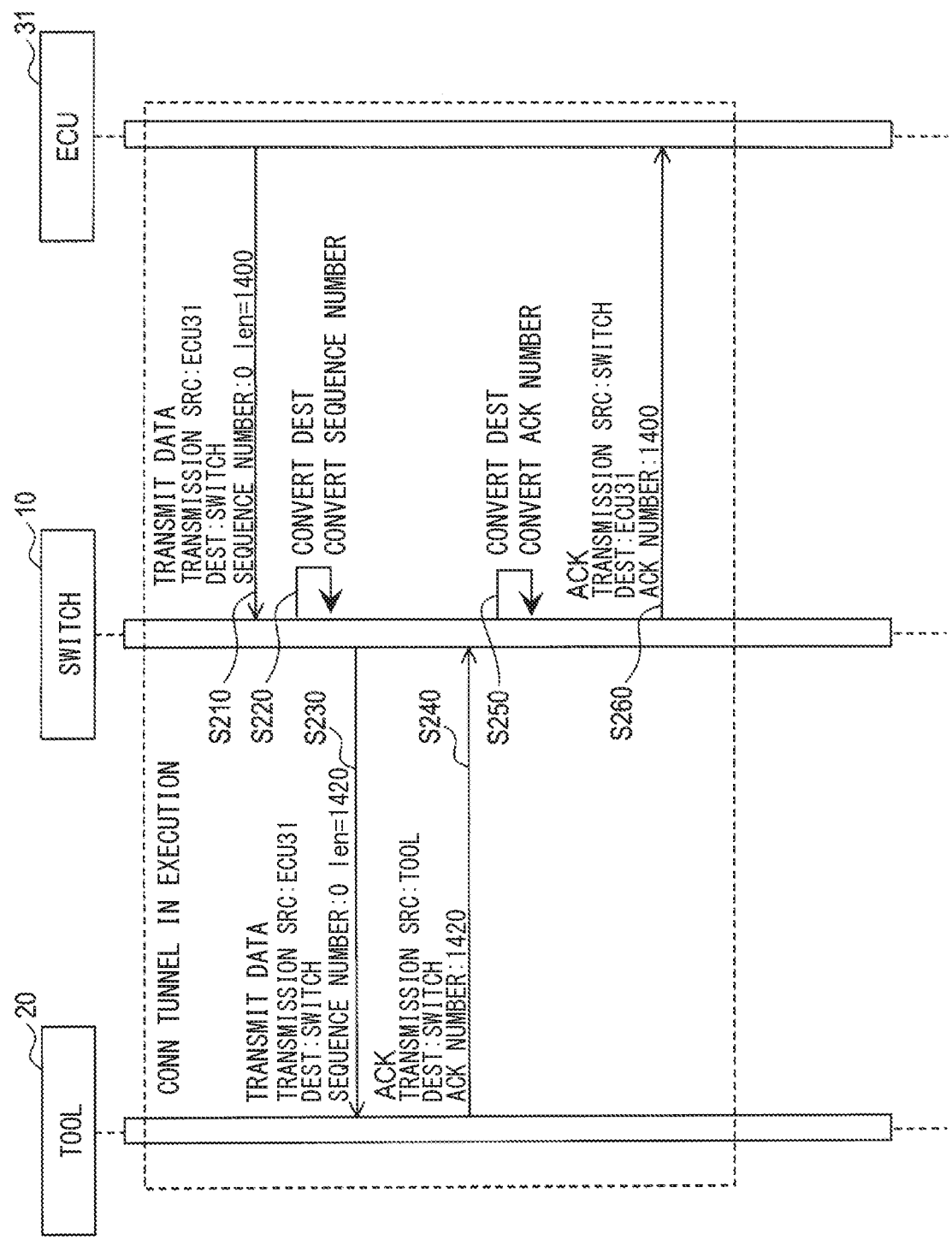
FIG. 6 is a sequence diagram showing one example of a process in which the frame is transmitted to the switch from the ECU via the tool.

Next, an operation example when the frame is transmitted from the ECU 31 to the tool 20 in a state where the connection between the tool 20 and the switch 10 and the connection between the switch 10 and the ECU 31 are established will be described with reference to a sequence diagram of FIG. 6.

First, the ECU 31 transmits the frame to the switch 10. In S210, the switch 10 receives this frame. In this frame, this destination address is switch 10, and the data length is 1400 bytes.

Next, in S220, the switch 10 performs the destination conversion and the sequence number conversion. As the destination conversion, the switch 10 changes the destination address from the switch 10 to the tool 20 and the transmission source address from the ECU 31 to the switch 10, in accordance with the connection tunnel configuration. Here, the switch 10 changes the data length from 1400 bytes to 1420 bytes.

Next, in S230, the switch 10 transmits the frame on which the destination conversion and sequence number conversion are performed to the tool 20. When receiving this frame, the tool 20 returns the ACK to the switch 10. Then, in S240, the switch 10 receives this ACK.

At this time, in the frame received by the switch 10, the destination address is the switch 10 and the ACK number is 1420. Next, in S250, the switch 10 performs the destination conversion and the ACK number conversion. As the destination conversion, the switch 10 changes the destination address from the switch 10 to the ECU 31 and the transmission source address from the tool 20 to the switch 10, in accordance with the connection tunnel configuration. The switch 10 changes the ACK number from 1420 to 1400.

Next, in S260, the switch 10 transmits the ACK on which the destination conversion and the ACK number conversion are performed to the ECU 31. In this way, the frame is transmitted from the ECU 31 to the tool 20.

[2-3. Effects]

According to the first embodiment detailed above, the following effects may be provided.

(2a) According to one aspect of the present disclosure, the switch 10 includes the multiple ports P0 to P4 connected to the tool 20 and the ECUs 31 to 34, and relays the frame by the connection type communication in which the frame is received and transmitted between the tool 20 and the ECUs 31 to 34. The switch 10 receives the reception frame from the ports P0 to P4 connected to the communication device corresponding to the frame transmission source, and determines the type of the reception frame by referring the upper header of the header portion in the reception frame. When the type of the reception frame is the predetermined type, the switch 10 generates the transmission frame obtained by rewriting the header portion of the reception frame in accordance with the predetermined condition. The switch 10 transmits the transmission frame from the ports P0 to P4 connected to the communication device corresponding to the transmission destination.

According to such a configuration, when the connection type communication is performed, the type of the reception frame is recognized by referring the header portion of the reception frame, and the transmission frame is generated by only rewriting the header portion. Accordingly, it may be not necessary to execute the process such as analyzing the description by the protocol in the upper layer of the reception frame from the payload. Accordingly, it may be possible to reduce the process load by the switch 10 when the frame including the description by the protocol in the upper layer than the protocol used for the connection type communication is relayed.

(2b) According to one aspect of the present disclosure, the protocol performing the connection type communication is set to the connection protocol, and the protocol in the upper layer than the connection protocol is set to the upper layer protocol. The switch 10 further includes the memory 12 that stores the connection tunnel table 13.

In the connection tunnel table 13, the address of the communication device corresponding to the transmission destination is associated with the logical address indicating the address in the upper layer protocol and is associated with the MAC address or the IP address indicating the address in the connection protocol.

The header portion of the reception frame includes the destination address (for example, the MAC address) destined for the switch 10 in the connection protocol, and an upper layer protocol (for example, the logical address in the upper layer header) destined for the communication device corresponding the transmission destination in the upper layer protocol.

The switch 10 extracts the MAC address or the IP address in accordance with the logical address from the connection tunnel table 13, and converts the destination address of the reception frame to the MAC address or the IP address in accordance with the logical address.

According to such a configuration, it may be possible to change the destination address to the communication device of the transmission destination with reference to the upper layer address of the reception frame. Therefore, it may be possible to reduce analysis load of the reception frame.

(2c) According to one aspect of the present disclosure, the switch 10 communicates the frame by the connection type communication in which the sequence number and the ACK number are exchanged between the tool 20 and the ECUs 31 to 34. When the difference of the amount of data communicated between the tool 20 and the ECUs 31 to 34 occurs, the switch 10 generates the transmission frame while correcting at least one of the sequence number or the ACK number of the reception frame in accordance with the difference of the data amount.

According to such a configuration, even when the amount of data communicated between the switch 10, the tool 20, and the ECUs 31 to 34 is different and thereby the difference of the data amount occurs, it may be possible to perform the relay while favorably correcting the sequence number and the ACK number.

(2d) According to one aspect of the present disclosure, as a case where the difference of the data amount occurs, when the header of the upper layer protocol in the upper layer than a layer of the connection type communication is changed or deleted and thereby the frame size in the connection protocol by the connection type communication is changed, the switch 10 generates the transmission frame while correcting the sequence number and the ACK number.

According to such a configuration, it may be possible to perform the relaying while favorably correcting the sequence number and the ACK number in the upper layer protocol.

(2e) According to one aspect of the present disclosure, the switch 10 performs the connection establishment by the handshake between the tool 20 and the ECUs 31 to 34 by proxy According to such a configuration, each communication device is able to perform the connection type communication with the destination or the transmission source by only establishing the connection with the switch 10.

3. Second Embodiment

[3-1. Difference from First Embodiment]

Since a basic configuration of a second embodiment is similar to the first embodiment, the difference will be described below. Note that the same reference numerals as those in the first embodiment indicate the same configuration, and refer to the previous descriptions.

In the first embodiment described above, the exchange of one frame between the tool 20 and the ECU 31 has been described. On the other hand, in the second embodiment, exchange of multiple frames will be described. Therefore, the second embodiment differs from the first embodiment in the exchange.

In a communication system 2 of the second embodiment, an example that the frame is transmitted from the tool 20 to the ECU 31 will be described. An example that the frame is transmitted from the ECU 31 to the tool 20 is similar to the example described above, and therefore will be omitted to be described.

[3-2. Process]

Figure 7:
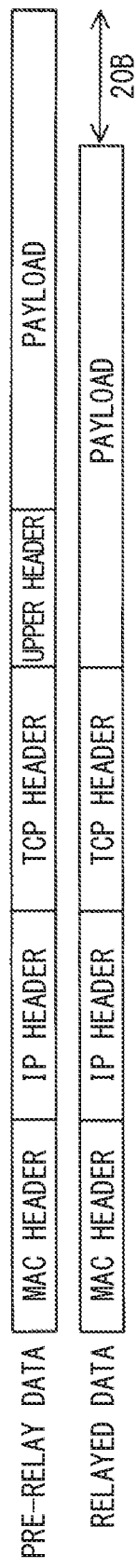
FIG. 7 is an explanatory diagram showing one example of a frame configuration before and after relaying.

Next, in the communication system 2 of the second embodiment, as shown in FIG. 7, the frame transmitted from the tool 20 to the switch 10 is set to pre-relay data, and the frame transmitted from the switch 10 to the ECU 31 is set to relayed data. The relayed data is set so that, compared to the pre-relay data, 20 bytes corresponding to the upper header are deleted and the data length is shortened by 20 bytes.

Figure 8:
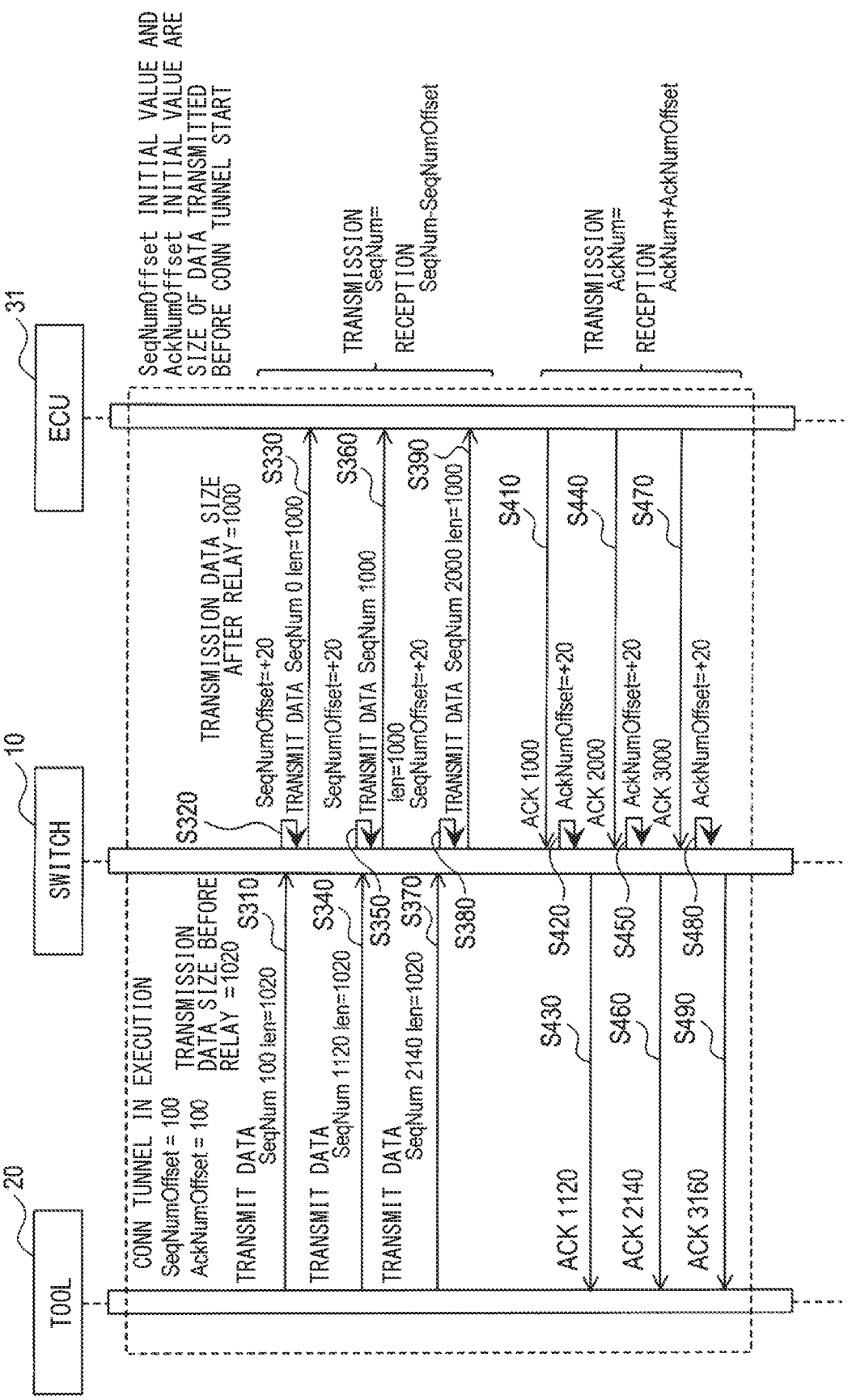
FIG. 8 is a sequence diagram showing an example of a process in which the frame is transmitted to the ECU from the switch via the tool in a second embodiment.

One example of a process in which the frame is transmitted from the switch 10 to the ECU 31 via the tool 20 will be described with reference to a sequence diagram of FIG. 8. In the present embodiment, each of the sequence number offset and the ACK number offset is set to 100 corresponding to 100 bytes. In the present embodiment, the transmission source of the frame continuously transmits multiple frame without waiting for the ACK. Specifically, as shown in FIG. 8, the tool 20 continuously transmits three frames.

The switch 10 sequentially receives the three frames transmitted from the tool 20 in each of S310, S340, and S370, In S320, S350, and S380, the switch 10 performs the destination conversion and the sequence number conversion for each frame, every time of receiving the frame.

The switch 10 receives the frame having the sequence number of 100 and the data length of 1020 in S310, and rewrites the frame to a frame having the sequence number of 0 and the data length of 1000 in consideration of the sequence number offset in S320. That is, the initial offset of 100 is subtracted from the sequence number, and the data length difference of 20 is subtracted from the data length. The destination conversion is similar to that of the first embodiment, and therefore a description will be omitted.

When the switch 10 receives the frame having the sequence number of 1120 and the data length of 1020 in S340, the switch 10 rewrites this frame to a frame having the sequence number of 1000 and the data length of 1000 in S350. That is, the sum of the initial offset of 100 and a value obtained by multiplying the cumulative offset of 20 by one, in other words, the sum of 120 is subtracted from the sequence number. The data length difference of 20 is subtracted from the data length.

Similarly, when the switch 10 receives the frame having the sequence number of 2140 and the data length of 1020 in S370, the switch 10 rewrites this frame to a frame having the sequence number of 2000 and the data length of 1000 in S380. That is, the sum of the initial offset of 100 and a value obtained by multiplying the cumulative offset of 20 by two, in other words, the sum of 140 is subtracted from the sequence number. The data length difference of 20 is subtracted from the data length.

In S330, S360, and S390, the switch 10 transmits the frame on which the destination conversion and sequence number conversion are performed to the ECU 31.

When receiving these frames from the switch 10, the ECU 31 returns the ACK each time. The switch 10 receives these ACKs in S410, S440, and S470, respectively, and performs the destination conversion and ACK number conversion in S420, S450, and S480.

Specifically, the switch 10 receives the ACK having the ACK number of 1000 for the frame having the sequence number of 1000 in S410. In S420, the switch 10 rewrites this ACK to an ACK of 1120 obtained by adding the initial offset of 100 and a value of 20 obtained by multiplying the cumulative offset of 20 by one to the ACK number of 1000.

The switch 10 receives the ACK having the ACK number of 2000 for the frame having the sequence number of 2000 in S440. In S450, the switch 10 rewrites this ACK to an ACK of 2140 obtained by adding the initial offset of 100 and a value of 40 obtained by multiplying the cumulative offset of 20 by two to the ACK number of 2000.

The switch 10 receives the ACK having the ACK number of 3000 for the frame having the sequence number of 3000 in S470. In S480, the switch 10 rewrites this ACK to an ACK of 3160 obtained by adding the initial offset of 100 and a value of 60 obtained by multiplying the cumulative offset of 20 by three to the ACK number of 3000.

Next, in S430, S460, and S490, the switch 10 transmits the ACK on which the destination conversion and the ACK number conversion are performed to the tool 20. In this way, the frame is transmitted from the tool 20 to the ECU 31.

[3-3. Effects]

The second embodiment described above provides the effect (2a) of the first embodiment described above and the following effect.

(3a) According to one aspect of the present disclosure, as the case where the difference of the data amount occurs, when the prior communication that is not a relay target is performed, the switch 10 generates the transmission frame while correcting the sequence number and the ACK number in accordance with the data amount of the prior communication.

According to such a configuration, it may be possible to perform the relaying while favorably correcting the sequence number and the ACK number even when there is the prior communication that is not the relay target.

4. Third Embodiment

[4-1. Difference from Second Embodiment]

In the second embodiment described above, it is assumed that all of the three frames are retransmitted when the transmission source does not normally receive the ACK. However, in a third embodiment, when the transmission source normally receives a part of the ACK, only a frame that has not been normally received can be transmitted.

[4-2. Configuration]

Figure 9:
FIG. 9 is an explanatory diagram showing one example of a sequence ring table.

In a communication system 3 of the third embodiment, the memory 12 includes a sequence ring table 15 (see FIG. 1). The sequence ring table 15 corresponds to a table in which a previous transmission index, an ACK index, a reception sequence number, a transmission sequence number, a sequence number offset, a transmission ACK number, and a reception ACK number are described for each frame to be relayed, as shown in FIG. 9. The sequence ring table 15 corresponds to a ring type table. In the sequence ring table 15, the oldest description is sequentially overwritten.

The previous transmission index indicates a position of the frame that the switch 10 received last from the transmission source. The ACK index indicates a position of the ACK that the switch 10 last received. The previous transmission index and the ACK index move downwards when the frame is normally relayed. When the ACK index catches up with the previous transmission index and the previous transmission index and the ACK index are at the same position of the frame, it indicates that the switch 10 has received all the ACKs of the relayed frame.

By contrast, when the previous transmission index catches up with the ACK index, the sequence ring table 15 is full. Therefore, the switch 10 stops the relay of the frame. Although the ACK number is described in the sequence ring table 15, the ACK number can be obtained by calculation. Therefore, it is not essential to describe the ACK number in the sequence ring table 15.

[4-3. Process]

[4-3-1. Normal Process]

Figure 10:
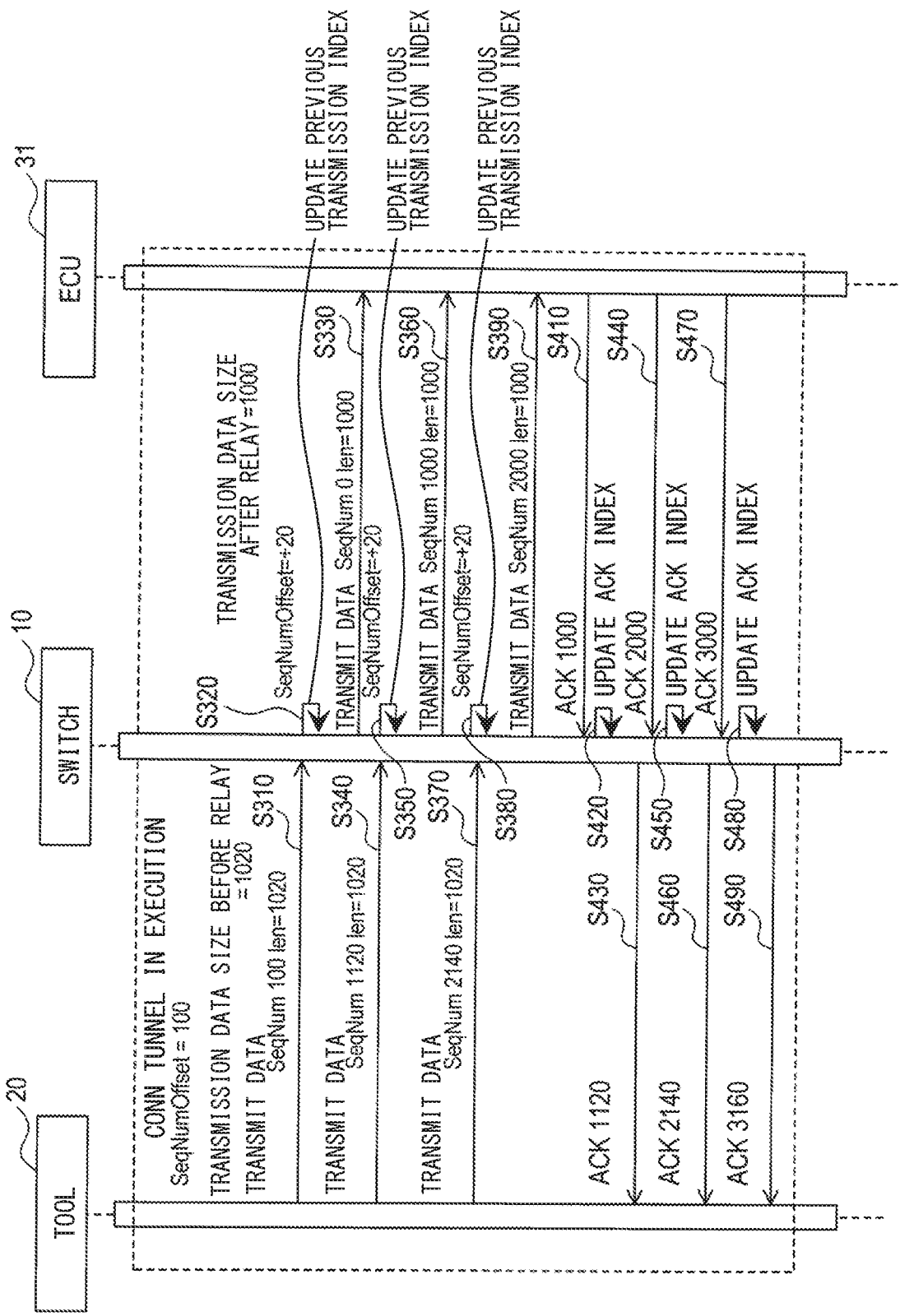
FIG. 10 is a sequence diagram showing an example of a process in which the frame is transmitted to the ECU from the switch via the tool in a third embodiment.

Next, in the communication system 3 of the third embodiment, similarly to the second embodiment, an example in which the frame is relayed from the tool 20 to the ECU 31 via the switch 10 will be described as shown in FIG. 10.

Similarly to the second embodiment, the switch 10 sequentially receives the three frames in each of S310, S340, and S370. In S320, S350, and S380, the switch 10 performs the destination conversion and the sequence number conversion for each frame, every time of receiving the frame.

Here, the switch 10 rewrites the frame as described above in S320, S350, and S380, and additionally describes information before and after the rewriting in the sequence ring table 15. In S320, the switch 10 describes the sequence number of 100 before the rewriting as the reception sequence number and the sequence number of 0 as the transmission sequence number in the sequence ring table 15. Further, the switch 10 respectively describes a value of 120 obtained by adding the initial offset of 100 to the cumulative offset of 20 as the sequence number offset, the sequence number of 1120 of the transmission frame as the transmission ACK number, and the sequence number of 1000 of the reception frame as the reception ACK number in the sequence ring table 15.

At this time, the previous transmission index is set to the position of the frame, and the ACK index is set to the initial position. The initial position is a position immediately before the frame. In an example shown in FIG. 9, the initial position is at the lowest row in the sequence ring table 15.

The switch 10 performs the description in the sequence ring table 15 in S350 and S380 similarly to S320. At this time, the previous transmission index is set to a position of a newly described frame, and the ACK index is not updated. Thereafter, in S330, S360, and S390, the switch 10 transmits the frame on which the destination conversion, the sequence number conversion, and the description of the sequence ring table 15 are performed to the ECU 31.

Similarly to the second embodiment, the switch 10 receives these ACKs in S410, S440, and S470, respectively, and performs the destination conversion and the ACK number conversion in S420, S450, and S480. However, the switch 10 updates the sequence ring table 15 in S420, S450, and S480.

Specifically, in S420, the switch 10 moves the ACK index to the position of the description in accordance with the ACK number of 1000 received in S410 in the sequence ring table 15. In S450, the switch 10 moves the ACK index to the position of the description in accordance with the ACK number of 2000 received in S440 in the sequence ring table 15. In S480, the switch 10 moves the ACK index to the position of the description in accordance with the ACK number of 3000 received in S470 in the sequence ring table 15. Thereafter, in S430, S460, and S490, the switch 10 transmits the frame on which the destination conversion, the ACK number conversion, and the update of the sequence ring table 15 are performed to the tool 20.

[4-3-2. Process when ECU is not Able to Receive Frame]

Next, an example in which the ECU 31 does not receive a part of the frame transmitted from the switch 10 will be described with reference to a sequence diagram of FIG. 11. This example shows a case where the ECU 31 does not receive the frame having the sequence number of 1000 transmitted by the switch 10 in S360.

Figure 11:
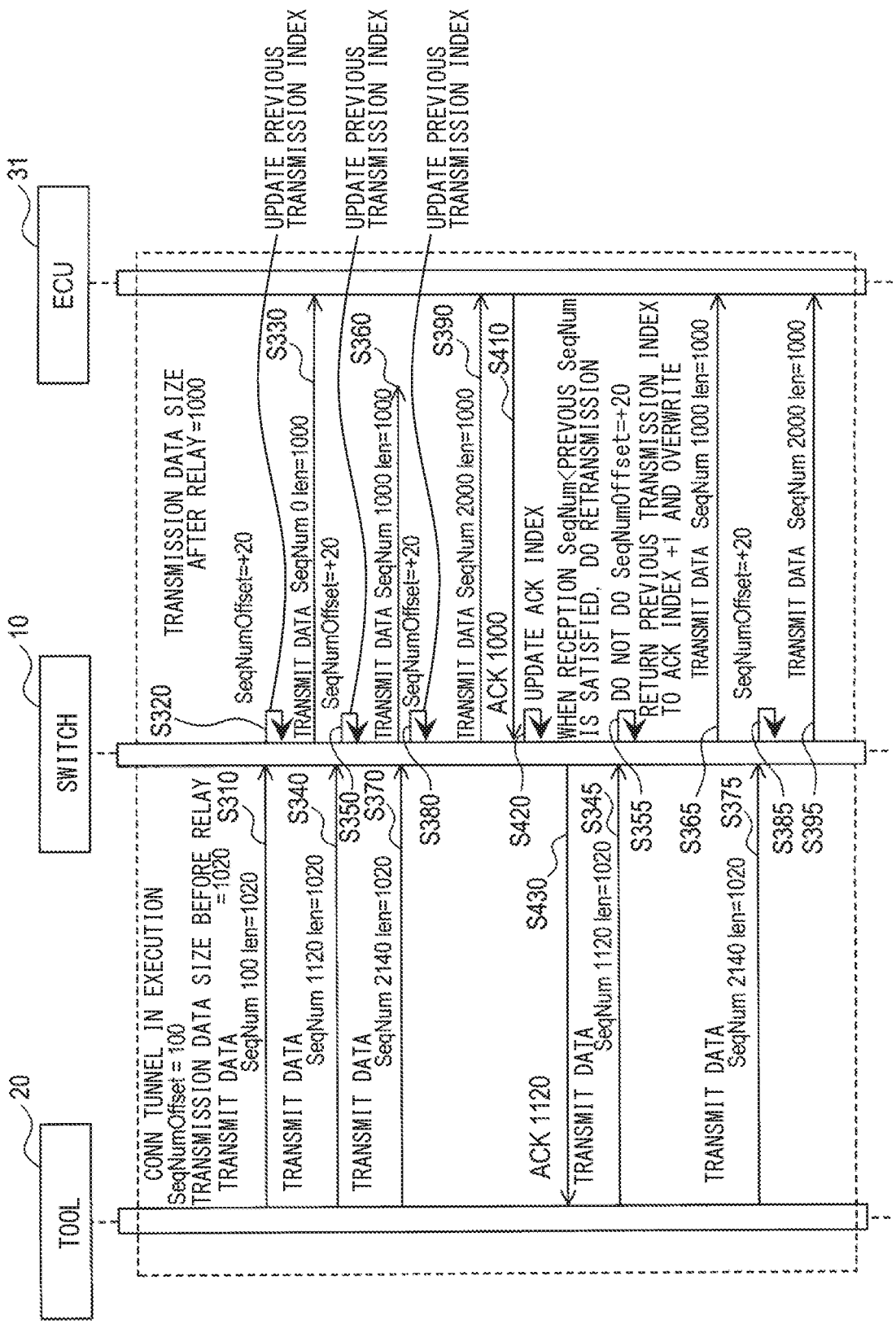
FIG. 11 is a sequence diagram showing one example of a process in a case where the ECU does not receive a part of the frame.

As shown in FIG. 11, even when the ECU 31 does not receive the frame, the frame having the sequence number of 2000 and transmitted by the switch 10 in S390 is transmitted to the ECU 31. At this time, the switch 10 moves the previous transmission index to a position in accordance with the transmission sequence number of 2000 in the sequence ring table 15, that is, the third row from the top of the sequence ring table 15 as shown in FIG. 12.

In this state, the switch 10 receives the ACK having the ACK number of 1000 from the ECU 31 in S410, and moves the ACK index to the position of the reception ACK number of 1000 in S420. Although the switch 10 transmits the ACK having the ACK number of 1120 to the tool 20 in S430, the switch 10 is not able to transmit the other ACKs. Therefore, the tool 20 times out the ACK reception, and retransmits the frame in which the ACK cannot be received, that is, the frame having the sequence number of 1120 and the frame having the sequence number of 2140.

The switch 10 receives these frames in S345 and S375, and performs the destination conversion, the ACK number conversion, and the update of the sequence ring table 15 in S355 and S385. In S355, the switch 10 compares the sequence number of the immediately received frame with the sequence number of the frame in accordance with a position of the previous transmission index. When the sequence number of the immediately received frame is smaller than or equal to the sequence number of the frame in accordance with the position of the previous transmission index, the switch 10 determines the immediately received frame as the retransmitted frame.

When the received frame is the retransmitted frame, as shown in FIG. 13, the switch 10 overwrites the description of this frame in the sequence ring table 15, and deletes the description regarding the frame having the larger sequence number than this frame. In an example shown in FIG. 13, as compared with the example in FIG. 12, the frame in accordance with the transmission sequence number of 2000, that is, the frame in the third row from the top is deleted. The previous transmission index is moved to be returned to the position of received frame.

In S385, the switch 10 updates the sequence ring table 15 similarly to S380. In S365 and S395, the switch 10 transmits the frame similarly to S360 and S390.

[4-3-3. Process when Switch Cannot Receive ACK]

Next, an example in which the switch 10 does not receive a part of the ACK transmitted from the ECU 31 will be described with reference to a sequence diagram of FIG. 14. This example shows a case where the switch 10 cannot receive the frame having the ACK number of 1000 to be received in S410 and the frame having the ACK number of 2000 to be received in S440.

Figure 14:
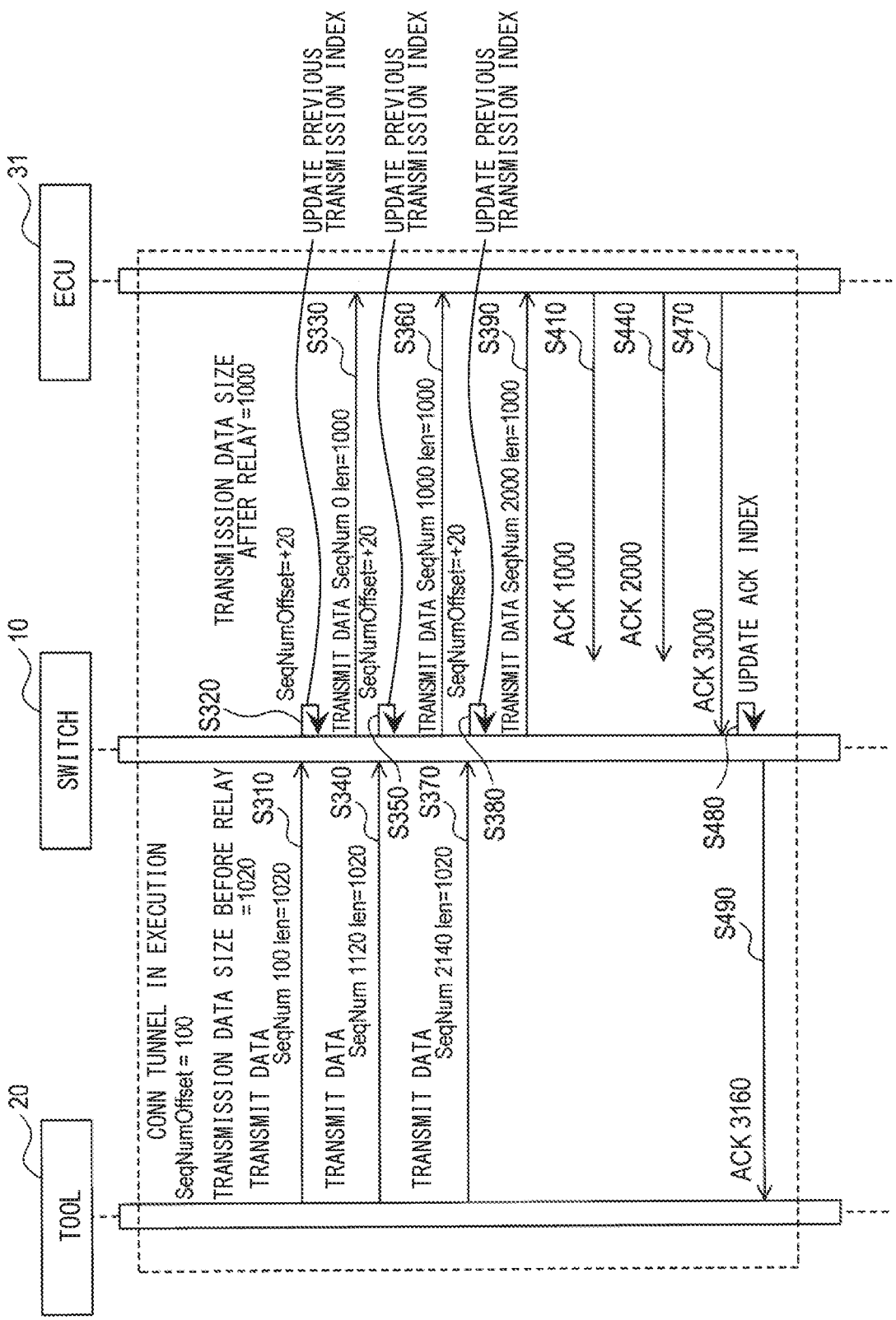
FIG. 14 is a sequence diagram showing one example of a process in a case where the switch does not receive a part of an ACK.

As shown in FIG. 14, the switch 10 normally performs the processes of S310 to S390, and the ECU 31 normally receives the frame from the switch 10. Although the ECU 31 transmits each ACK, the switch 10 cannot receive the ACKs that correspond to the ACKs to be received in S410 and S440 and have the ACK numbers of 1000 and 2000.

However, the switch 10 receives the ACK having the ACK number of 3000 in S470. In S480, as shown in FIG. 15, the switch 10 moves the ACK index to the position of the frame in accordance with the ACK number of 3000. Next, the switch 10 transmits the ACK having the ACK number of 3160 to the tool 20 in S490.

In the description described above, the tool 20 does not receive the ACK having the ACK number of 1120 and the ACK having the ACK number of 2140 to be received in S430 and S460. However, since the tool 20 has been able to receive the ACK having the ACK number of 3160 larger than the ACK numbers of 1120 and 2140, the tool 20 determines that the frame before the frames in accordance with the ACK number of 3160 has been transmitted. Therefore, the retransmission of the frame is not performed. In this case, as shown in FIG. 15, the previous transmission index has caught up with the ACK index, in other words, the transmission of all frames has been completed. However, when the tool 20 has received the ACK having the ACK number of 2140 and has not receive the ACK having the ACK number of 3160 larger than the ACK number of 2140, the tool 20 determines that this frame should be retransmitted. Only the corresponding frame (the frame having the reception sequence number of 2140) is retransmitted.

[4-4. Effects]

The third embodiment described above provides the effect (2a) of the first embodiment described above and the following effect.

(4a) According to one aspect of the present disclosure, the switch 10 includes the memory 12 that records the ring type sequence ring table 15 in which the past transmission reception sequence number, the ACK number, the previous transmission index, and the ACK index are described. The switch 10 recognizes the difference of the data amount by referring the sequence ring table 15. When generating the transmission frame, the switch 10 rewrites the sequence ring table 15.

According to such a configuration, it may be possible to manage the difference of the data amount between the switch 10, the tool 20, and the ECUs 31 to 34 by using the sequence ring table 15. It may be possible to determine which frame has been transmitted to the ECUs 31 to 34 or which frame is necessary to be retransmitted by moving the previous transmission index and the ACK index. Therefore, it may be possible to improve communication reliability between the tool 20 and the ECUs 31 to 34.

5. Fourth Embodiment

[5-1. Differences from First to Third Embodiments]

In the first to third embodiments described above, the example in which the tool 20 relays the frame with the ECU 31 as one destination via the switch 10 has been described. However, a communication system 4 of the fourth embodiment is different from those of the first to third embodiments in that the tool 20 relays the frame with the ECUs 31 and 32 as multiple destinations via the switch 10.

[5-2. Configuration]

Figure 17:
FIG. 17 is an explanatory diagram showing one example of a sequence ring table for a second ECU.

In the communication system 4 of the fourth embodiment, the memory 12 includes multiple sequence ring tables 15 and 16 (see FIG. 1) for the ECU 31 and the ECU 32 as the destinations. The sequence ring table 15 corresponds to a table dedicated to the ECU 31 as shown in FIG. 16, and has the similar configuration to the sequence ring table 15 described above. The sequence ring table 16 corresponds to a table dedicated to the ECU 32 as shown in FIG. 17, and has the similar configuration of the sequence ring table 15 described above.

[5-3. Process]

Figure 18:
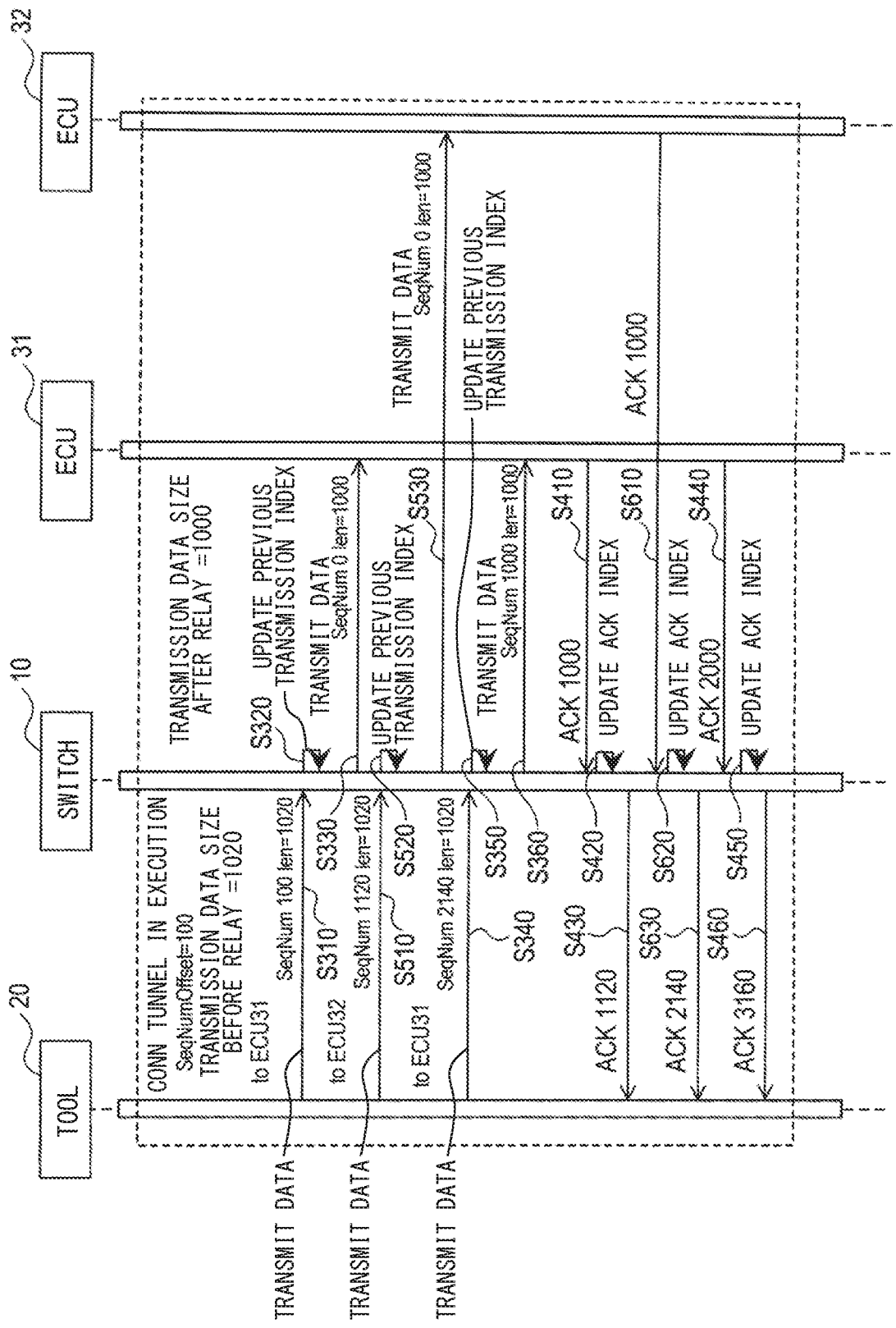
FIG. 18 is a sequence diagram showing an example of a process in which the frame is transmitted to the ECU from the switch via the tool in a fourth embodiment.

Next, in the communication system 4 of the third embodiment, an example in which the frame is relayed from the tool 20 to the ECUs 31 and 32 via the switch 10 will be described with reference to a sequence diagram of FIG. 18.

While receiving the frames destined for the ECU 31 from the tool 20 in S310 and S340 described above, the switch 10 receives the frame destined for the ECU 32 between these frames in S510. That is, the tool 20 continuously transmits the frame destined for the ECU 31, the frame destined for the ECU 32, and the frame destined for the ECU 31 in this order.

Similarly to the processes described above, the switch 10 performs the processes in S320, S330, S350, and S360 on the frame destined for the ECU 31, When the sequence ring table 15 for the ECU 31 is rewritten, the sequence ring table 16 for the ECU 32 is not affected.

In S520 and S530, the switch 10 performs the processes similar to the processes in S320 and S330 on the frame destined for the ECU 32. However, the switch 10 performs the description in the sequence ring table 16 for the ECU 32 in S520. When the sequence ring table 16 for the ECU 32 is rewritten, the sequence ring table 15 for the ECU 31 is not affected.

The switch 10 receives the ACK for the frame transmitted to the ECU 31 from the ECU 31 in S410 and S440, and performs the destination conversion, the ACK number conversion, and the update of the sequence ring table 15 for the ECU 31, similarly to S420 and S450. Thereafter, in S430 and S460, the switch 10 transmits the frame on which the destination conversion, the ACK number conversion, and the update of the sequence ring table 15 have been performed to the tool 20.

The switch 10 receives the ACK for the frame transmitted to the ECU 32 from the ECU 32 in S610, and performs the destination conversion, the ACK number conversion, and the update of the sequence ring table 16 for the ECU 32 in S620, similarly to S420.

Thereafter, in S630, the switch 10 transmits the frame on which the destination conversion, the ACK number conversion, and the update of the sequence ring table 16 have been performed to the tool 20.

[5-4. Effects]

The fourth embodiment described above provides the effect (2a) of the first embodiment described above and the following effect.

(5a) One aspect of the present disclosure includes three or more transfer destination ports, and the memory 12 includes the sequence ring tables 15 and 16 for each of the transfer destination ports. The switch 10 rewrites the sequence ring tables 15 and 16 for each of the transfer destination ports.

According to such a configuration, the switch 10 is able to simultaneously perform the connection type communication with the tool 20 and the multiple ECUs 31 to 34.

6. Correspondence Relation Between Configuration of Embodiments and Configuration of Present Disclosure The switch 10 in the embodiments described above may correspond to a relay apparatus in the present disclosure. The tool 20 and the ECUs 31 to 34 in the embodiments described above may correspond to a communication device in the present disclosure. The memory 12 in the embodiments described above may correspond to a transfer destination recorder and a number recorder in the present disclosure. The connection tunnel table 13 in the embodiments described above may correspond to transfer destination information in the present disclosure. The sequence ring tables 15 and 16 in the embodiments described above may correspond to a sequence table in the present disclosure. The communication by the TCP protocol in the embodiments described above may correspond to a connection type communication in the present disclosure. The configuration of S115 executed by the switch 10 in the embodiments described above may correspond to a type determiner in the present disclosure. The configurations of S140, S170, S220, S250, S320, S350, S355, S380, S385, S420, S450, S5480, S520, and S620 in the embodiments described above may correspond to a rewriter in the present disclosure.

The configurations of S150, S180, S230, and S260 in the embodiments described above may correspond to a transmitter in the present disclosure. The configurations of S110 and S125 in the embodiments described above may correspond to a proxy portion in the present disclosure.

7. Fifth Embodiment

[7-1. Configuration]

According to one aspect of the present disclosure, a communication system 1001 corresponds to, for example, a system that includes a main part mounted on a vehicle such as a passenger vehicle and is used for relaying the frame between each of communication devices inside or outside the vehicle.

The communication system 1001 shown in FIG. 19 includes a switch 1010 corresponding to a relay apparatus. The communication system 1001 may include a tool 1020, an ECU (Electronic Control Unit) 1031, an ECU 1032, an ECU 1033, and an ECU 1034. The switch 1010 may include a communication ports P1000, P1001, P1002, P1003, and P1004.

The tool 1020 is connected to a communication line 1040. The ECU 1031 is connected to a communication line 1041. The ECU 1032 is connected to a communication line 1042. The ECU 1033 is connected to a communication line 1043. The ECU 1034 is connected to a communication line 1044. Each of the tool 1020, the ECU 1031, the ECU 1032, the ECU 1033, and the ECU 1034 configures a communication device communicating with each other via the communication lines 1040 to 1044 and the switch 1010.

The five communication lines 1040 to 1044 are connected in order to the communication ports P1000 to P1004. That is, the tool 1020 is connected to the communication port P1000 via the communication line 1040. The ECU 1031 is connected to the communication port P1001 via the communication line 1041. The ECU 1032 is connected to the communication port P1002 via the communication line 1042. The ECU 1033 is connected to the communication port P1003 via the communication line 1043. The ECU 1034 is connected to the communication port P1004 via the communication line 1044, The communication ports P1000 to P1004 function as the transceiver transmitting and receiving the frame.

The switch 1010 is configured as the Ethernet (registered trademark) switch corresponding to the gateway. The switch 1010 performs communication by using the protocol such as, for example, the DoIP (Diagnostics over Internet Protocol), the Ethernet, and the TCP (Transmission Control Protocol). The switch 1010 relays the frame while filtering the frame among the communication lines 1040 to 1044.

The switch 1010 is configured as, for example, as the hardware including the circuit such as the semiconductor device or the like. The switch 1010 further includes a controller 1011 and a memory 1012.

The controller 1011 manages overall relay of the frame. The controller 1011 is configured as, for example, the integration circuit, the microcomputer, or the like. The memory 1012 corresponds to, for example, the volatile memory. However, the memory 12 may correspond to the rewritable nonvolatile memory.

For example, the controller 1011 selects relaying of the received frame or discarding of the received frame in accordance with a filtering rule prepared in advance, and performs the selected one. Operation of the switch 1010 corresponds to operation implemented by the controller 1011. Hereinafter, a process executed by the controller 1011 will be described as a process executed by the switch 1010.

The filtering rule corresponds to a rule for determining a process of relaying the frame, a process of discarding the frame, or the like in accordance with a frame characteristic such as an address, a frame format, a data length of the frame, or a class of the frame in the received frame.

Here, although transmission and reception can be performed without division in the TCP, non-divided data before division into multiple frames, transmission, and reception may be also referred to as large data in the DoIP, Each data obtained by dividing the large data into multiple may be also referred to as division data. Whether the frame received by the switch 1010 is the division data can be determined by the controller 1011 recognizing the type of the frame at the time of filtering.

The frame communicated in the communication system 1001 corresponds to, for example, a frame as shown in FIG. 20. This frame is generated by an application handling the protocol of the fifth layer or more in the OSI reference model. This frame includes the TCP header for performing communication in the TCP corresponding to the protocol of the fourth layer in the 051 reference model. In the present embodiment, as the protocol of the fifth layer or more, the DoIP described above or a dedicated protocol for diagnosis is employed.

This frame includes a header portion including the MAC header, the IP header, the TCP header, and the upper header, and the payload portion as the actual data. The payload portion is set, for example, within a range of 4 bytes to 4 giga bytes.

Each of the headers configuring the header portion includes the preamble, the destination address, the transmission source address, the type, or the like. The TCP header includes the sequence number, the ACK number, and the various flags in addition to these addresses or the like. The upper header includes the data in accordance with the application.

For example, the upper header includes the logical address corresponding to the destination address used in the application. The logical address may include the transmission source address used in the application. The upper header includes the data total length.

When the received frame is the large data, the data total length indicates a total amount of data configuring this large data, in other words, a total amount of each of the division data. The payload portion of each of the multiple frames includes each division data.

The memory 1012 records a connection tunnel table 1013, a sequence number management table 1014, and a sequence ring table 1015. The memory 1012 includes a data total length recorder 1017.

In the connection tunnel table 1013, as shown in FIG. 21, the logical address is associated with the IP address or the MAC address corresponding to the destination address used in the TCP connection. In an example shown in FIG. 21, a logical address of 01 is associated with the IP address or the MAC address of the ECU 1031. A logical address of 02 is associated with the IP address or the MAC address of the ECU 1032.

The protocol performing the connection type communication is set to the connection protocol, and the protocol in the upper layer than the connection protocol is set to the upper layer protocol. The TCP corresponds to a connection protocol of the present disclosure. The DoIP corresponds to an upper layer protocol of the present disclosure. The logical address in the connection tunnel table 1013 corresponds to a first address. The IP address or the MAC address in the connection tunnel table 1013 corresponds to a second address of the present disclosure.

The sequence number management table 1014 corresponds to a table in which contents of the relayed frame are temporarily described. Details of the sequence number management table 1014 will be described later.

The sequence ring table 1015 corresponds to a table for managing various information on data to be relayed. Details of the sequence ring table 1015 will be described later.

When the upper header includes the data total length, this data total length is recorded in the data total length recorder 1017. The recorded data total length is retained until the relay of the corresponding large data is completed, and used for comparison with the data amount of the received division data. The recorded data total length can be deleted or overwritten after the relay of the corresponding large data is completed.

The tool 1020 is connectable to and detachable from the communication line 1040. The tool 1020 is connected to the switch 1010 via the communication line 1040 as needed at the time of vehicle inspection or the like. The tool 1020 corresponds to a device that communicates with one ECU or multiple ECUs among the ECUs 1031 to 1034 set in advance, thereby reads out information such as diagnosis recorded in the memories of these ECUs 1031 to 1034, and performs vehicle diagnosis based on the read out information, when the tool 1020 is connected to the switch 1010 via the communication line 1040. The tool 1020 has a function of rewriting a program stored in the ECUs 1031 to 1034 by transmitting the frame to the ECUs 1031 to 1034.

The ECUs 1031 to 1034 correspond to an electronic control unit having a function of controlling a configuration element of the vehicle such as the engine, the air conditioner, the audio, a millimeter wave radar, or a Lidar, and additionally has a communication function of communicating the frame described above.

[7-2. Process]

[7-2-1. Connection Establishment and Schematic Process of Relay]

Figure 22:
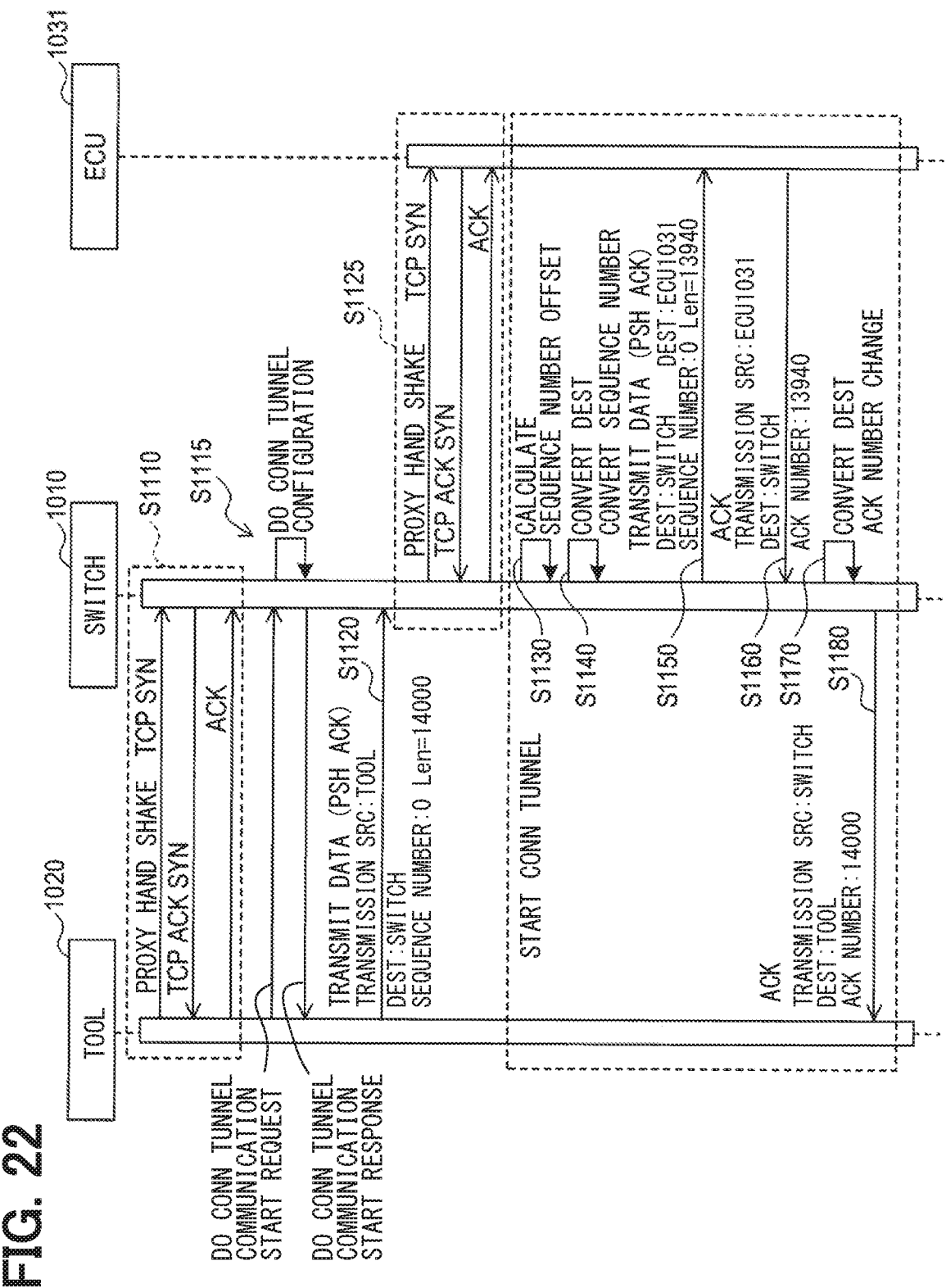
FIG. 22 is a sequence diagram showing an example of a process in which a frame is transmitted to an ECU from a switch via a tool for establishing connection.

Next, one example of a process in which the switch 1010 and the ECU 1031 exchange the frame via the tool 1020 will be described with reference to a sequence diagram of FIG. 22. Hereinafter, a configuration performed by the controller 1011 of the switch 1010 will be mainly described. A process in which the switch 1010 and each of the ECUs 1032 to 1034 exchange the frame via the tool 1020 is basically similar, and therefore the description will be omitted.

When the tool 1020 transmits the frame to the ECU 1031, the tool 1020 and the switch 1010 perform a procedure for exchanging the frame between the tool 1020 and the switch 1010 in S1110. Here, first, the handshake for establishing the TCP connection between the tool 1020 and the switch 1010 is performed.

That is, the switch 1010 performs a substitute handshake (also referred to as a proxy handshake) that performs the handshake instead of the ECU 1031. Here, as the handshake, three-way handshake performing a TCP SYN, a TCP ACK SYN, and a TCP ACK is employed.

Next, the tool 1020 transmits a start request of the connection tunnel communication to the switch 1010 when establishing the TCP connection with the switch 1010. This start request includes the logical address described above as contents of the upper header. The connection tunnel communication indicates communication that recognizes each header portion of the frame, rewrites a part of the header portion, and relays the frame without changing the payload.

Next, the switch 1010 receives the start request of the connection tunnel communication in S1115, and performs the connection tunnel configuration, that is, setting for the connection tunnel communication in S1120. As described later in detail, the tool 1020 transmits to the switch 1010, a frame in which a logical address of the upper header is different from a destination address used in the TCP.

Specifically, the destination address in the TCP indicates the switch 1010, and the logical address indicates the ECU 1031 or the like. Therefore, the switch 1010 is required to rewrite the destination address in the TCP from the switch 1010 to the ECU 1031 or the like when relaying the frame.

In the configuration of the present embodiment, the connection tunnel table 1013 is prepared. Therefore, it may be possible to identify the destination address in accordance with the logical address of the upper header by referring the connection tunnel table 1013. That is, the connection tunnel configuration is set so as to be capable of rewriting the destination address in the TCP from the switch 1010 to the ECU 1031 or the like by a simple process when the next frame is received during establishment of the TCP connection, by referring the connection tunnel table 1013.

In other words, the switch 1010 receives the frame from the ports P1000 to P1004 connected to the communication device as the frame transmission source, and determines the type of the frame by referring the upper header as the header portion of this frame. Here, the determination of the frame type may be performed each time when the frame is received. However, in the present embodiment, it will be described that, only when the TCP connection is established, the determination of the frame type is performed and, during the establishment of the TCP connection, the determination of the frame type is omitted.

When the determination of the frame type is omitted, it is assumed that the frame type during the establishment of the TCP connection is same as the frame type recognized when the TCP connection is established, and the following process proceeds. The configuration in which the determination of the frame type is omitted is applied to not only the communication between the switch 1010 and the tool 1020 but also the communication between the switch 1010 and the ECUs 1031 to 1034.

Hereinafter, operation when the type of the received frame corresponds to a frame by a protocol set in advance such as the DoIP will be described. When the type does not correspond to the protocol set in advance, the normal relay by the TCP, that is, relay after analysis of the payload may be performed.

When the connection tunnel configuration is completed, the switch 1010 transmits a response to the start request of the connection tunnel communication to the tool 1020, Then, the tool 1020 starts to transmit the frame including the actual data to be transmitted to the ECUs 1031 to 1034 as the destination.

Figure 23:
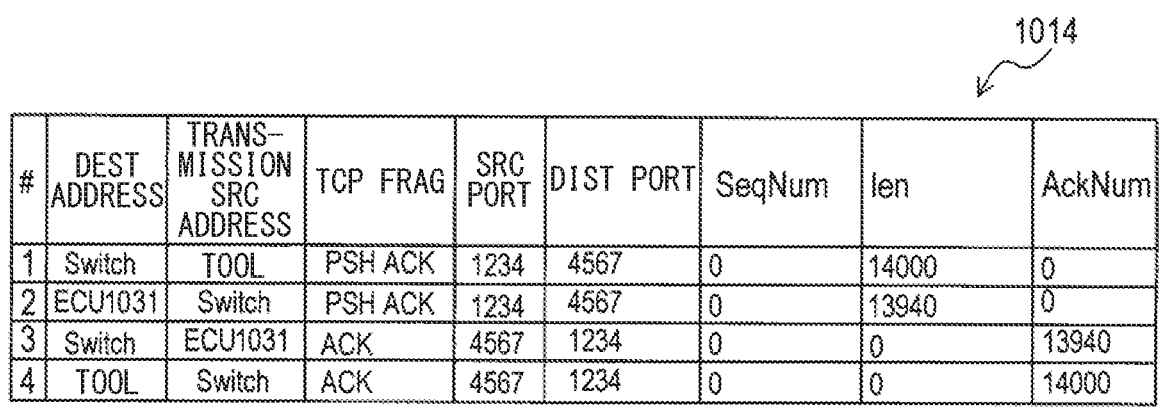
FIG. 23 is an explanatory diagram showing one example of a data management table.

The switch 1010 receives the frame in S1120, and manages data by the sequence number management table 1014 shown in FIG. 23. That is, the switch 1010 describes the transmission source address, the destination address, the TCP flag, and the data length (len) in the sequence number management table 1014 in accordance with the header portion of the frame. The switch 1010 appropriately performs calculation or the like, and thereby describes the ports P1000 to P1004 (SRC ports) receiving the frame, the ports P1000 to P1004 (DIST ports) connected to the transmission destination of the frame, the sequence number (seqNum), the ACK number (AckNum), or the like.

Here, the switch 1010 receives the frame from the tool 1020. For example, the switch 1010 describes, as shown by "1" of the "#" column in FIG. 23, the switch 1010 as the destination address, and the tool 1020 as the transmission source address, and 14000 bytes as the data length (len) or the like.

Next, in S1125, the switch 1010 performs the substitute handshake between the ECUs 1031 to 1034 as the destination, similarly to the substitute handshake described above. In the present embodiment, a case where the destination is the ECU 1031 will be described. Due to this process, the switch 1010 becomes in a state where the TCP connection with both of the tool 1020 and the ECU 1031 is established, in other words, in a state where the connection tunnel can be performed.

Next, in S1130, the switch 1010 calculates a sequence number offset. The sequence number offset includes an initial offset and a cumulative offset. Here, in the switch 1010, a prior communication corresponding to communication before the actual data is relayed may cause a difference between a communication data amount for the transmission source and a communication data amount for the destination. Here, this difference is calculated as the initial offset described above.

For example, when a difference obtained by subtracting a communication data amount by a prior communication with the destination from a communication data amount by the prior communication with the transmission source is +4 bytes, this difference is set to the initial offset. In this case, when transmitting the frame to the transmission source, the switch 1010 adds 4 to the sequence number and the ACK number. When transmitting the frame to the destination, the switch 10 subtracts 4 from the sequence number and the ACK number.

When a data length of a frame from the transmission source is different from a data length of a frame to the destination, for example, when the communication protocol differs depending on the ports P0 to P4, the difference of the data length is calculated as the cumulative offset described above. Here, the data length of the frame from the transmission source is 14000 bytes, and the data length of the frame to the destination is smaller than that of the frame from the transmission source by 60 bytes. Therefore, it is set so that the data length of the frame to the destination is described as 13940 bytes. The initial offset is constant regardless of the number of transmissions of the frame. However, since the cumulative offset increases in proportion to the number of transmissions of the frame, the cumulative offset is added or subtracted every frame transmission.

Next, in S1140, the switch 1010 performs the destination conversion and the sequence number conversion. As the destination conversion, as shown by "2" of the "#" column in FIG. 23, the switch 1010 changes the destination address from the switch 1010 to the ECU 1031 and changes the transmission source address from the tool 1020 to the switch 1010, in accordance with the connection tunnel configuration. The switch 1010 changes the data length from 14000 bytes to 13940 bytes. The sequence number conversion is performed when the necessity of correcting the sequence number occurs.

Next, in S1150, the switch 1010 transmits the frame on which the destination conversion and the sequence number conversion are performed to the ECU 1031. When receiving this frame, the ECU 1031 returns the ACK to the switch 1010. Then, in S1160, the switch 1010 receives this ACK.

At this time, the frame received by the switch 1010 has the destination address of the switch 1010, the transmission source address of the ECU 1031, and the ACK number of 13940, as shown by "3" of the "#" column in FIG. 23.

Next, in S1170, the switch 1010 performs the destination conversion and the ACK number conversion. As the destination conversion, as shown by "4" of the "#" column in FIG. 23, the switch 1010 changes the destination address from the switch 1010 to the tool 1020 and changes the transmission source address from the ECU 1031 to the switch 1010, in accordance with the connection tunnel configuration. The switch 10 changes the ACK number from 13940 to 14000.

That is, since the ECU 1031 receives the frame having the data length of 13940 bytes, the ECU 1031 transmits the ACK number of 13940. However, the tool 1020 transmits the frame having the data length of 14000 bytes. Therefore, there is a difference between the ACK number of the received ACK and the data length of 13940 bytes. In order to correct the difference, the switch 1010 changes the ACK number from 13940 to 14000. The correction amount of the ACK number is similar to the difference of the data length calculated in the S1130.

Next, in S1180, the switch 1010 transmits the ACK on which the destination conversion and the ACK number conversion are performed to the tool 1020, In this way, the frame is transmitted from the tool 1020 to the ECU 1031.

[7-2-2. Large Data Relay Process]

Figure 24:
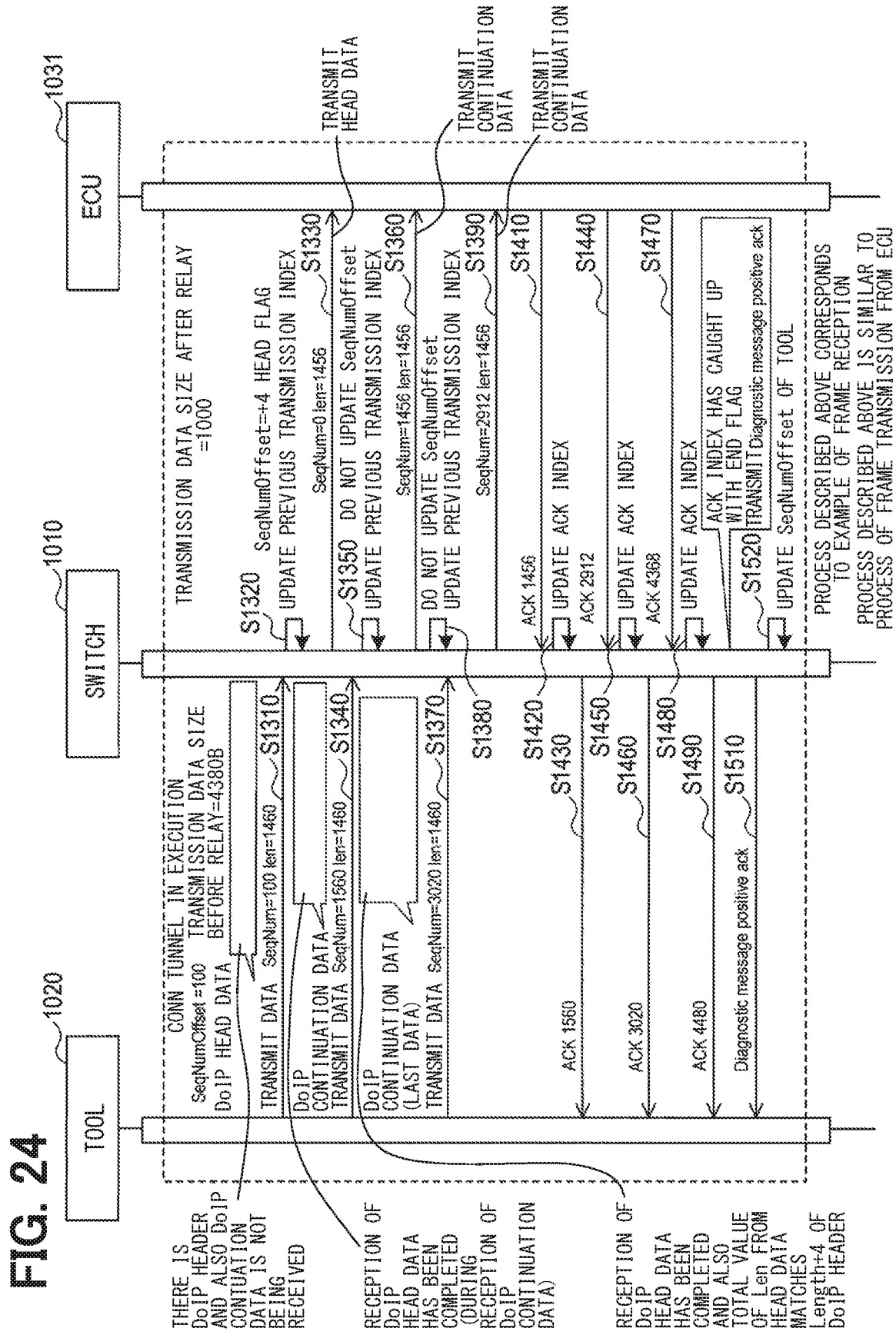
FIG. 24 is a sequence diagram showing an example of a process in which the frame is transmitted to the tool from the ECU via the switch after establishing the connection.

The processes in S1130 to S1180 described above can be replaced with processes shown in FIG. 24 when the division data obtained by dividing the large data is used. However, the processes will be described by using the sequence number and the ACK number, or the like different from those described above.

Figure 25:
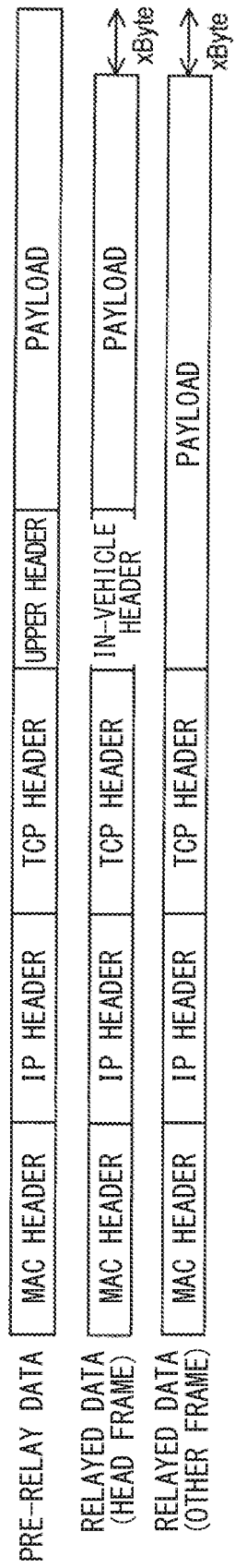
FIG. 25 is an explanatory diagram showing one example of a frame configuration before and after relaying.

Here, as shown in FIG. 25, the frame transmitted from the tool 1020 to the switch 1010 is set to pre-relay data, and the frame transmitted from the switch 1010 to the ECU 1031 is set to relayed data. When the relayed data includes the division data and, particularly, this division data is the first received division data among the multiple division data, the switch 1010 changes the upper header of the pre-relay data to an in-vehicle header. As the result, the data length of the relayed data is shorter than the pre-relay data by x bytes of a difference between the data amounts of the upper header and the in-vehicle header.

The difference in the data amount between the upper header and the in-vehicle header is, for example, 4 bytes. The in-vehicle header includes, for example, the destination address, the transmission source address, and the data length. When the relayed data includes the division data and when this division data is division data other than the first received division data among the multiple division data, the switch 1010 omits the in-vehicle header in the relayed data.

Figures 26, 27:
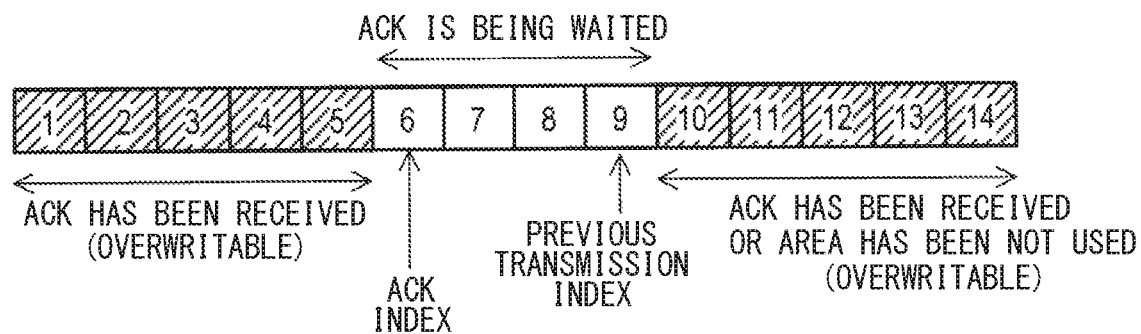
FIG. 26 is an explanatory diagram showing one example of a sequence ring table.
FIG. 27 is a schematic diagram showing the sequence ring table.

As described above, when the frame including the division data is transmitted from the ECU 1031 to the tool 1020, the sequence ring table 1015 is used. The sequence ring table 1015 corresponds to a table in which a head flag, an end flag, the previous transmission index, the ACK index, the reception sequence number, the transmission sequence number, the sequence number offset, the transmission ACK number, and the reception ACK number are described for each frame to be relayed, as shown in FIG. 26, The sequence ring table 1015 corresponds to a ring type table. In the sequence ring table 1015, the oldest description is sequentially overwritten.

Specifically, as shown in FIG. 27, for example, when the sequence ring table 1015 manages the frame by fourteen areas, areas from a position of the ACK index to a position of the previous transmission index are set to be overwritable. In an example shown in FIG. 27, information on a new frame is described in order from the tenth area.

However, the previous transmission index indicates a position of the frame that the switch 1010 received last from the transmission source. The ACK index indicates a position of the ACK that the switch 1010 received last. The previous transmission index and the ACK index move downwards in the table shown in FIG. 26 when the frame is normally relayed. In a case where the ACK index catches up with the previous transmission index, when the previous transmission index and the ACK index are at the same position of the frame, it is indicated that the switch 1010 has received all the ACKs of the relayed frame.

By contrast, when the previous transmission index catches up with the ACK index, the sequence ring table 1015 is full. Therefore, the switch 1010 stops relaying the frame. Although the ACK number is described in the sequence ring table 1015, the ACK number can be obtained by calculation. Therefore, it is not essential to describe the ACK number in the sequence ring table 1015.

In the process relaying the large data shown in FIG. 24, the switch 1010 sequentially receives the frame transmitted from the tool 1020 in S1310, S1340, and S1370, that is, receives three frames. In S1320, S1350, and S1380, the switch 1010 performs the destination conversion and the sequence number conversion for each frame, every time of receiving the frame.

The switch 1010 receives the frame having the sequence number of 100 and the data length of 1460 in S1310, and rewrites the frame to a frame having the sequence number of 0 and the data length of 1456 in consideration of the sequence number offset in S1320. That is, the initial offset of 100 is subtracted from the sequence number, and the data length difference of 4 is subtracted from the data length.

At this time, the switch 1010 performs the destination conversion. That it, the switch 1010 changes the destination address from the switch 1010 to the tool 1020 and the transmission source address from the ECU 1031 to the switch 1010, in accordance with the connection tunnel configuration.

At this time, the switch 1010 recognizes the head division data has been received based on a condition that the DoIP header exists in the reception frame and also the division data is being not received. A state where the division data is being received indicates a state where the reception of the large data with the head flag has not been completed. The switch 1010 is able to recognize the state by referring the sequence ring table 1015 and the data total length recorder 1017.

When receiving the head division data, the switch 1010 records the data total length in the data total length recorder 1017. The DoIP header includes the data total length. Here, the data total length is 4380 bytes.

During the reception of the frame, the switch 1010 calculates a cumulate value of the data amount of the division data, holds this cumulate value in the memory 1012, and compares this cumulate value with the data total length recorded in the data total length recorder 1017. When the cumulate value of the data amount matches the data total length, the switch 1010 recognizes that the reception of the large data has been completed. In S1340 and S1380, the switch 1010 recognizes that division data is being received.

When the switch 1010 receives the frame having the sequence number of 1560 and the data length of 1460 in S1340, the switch 1010 rewrites this frame to a frame having the sequence number of 1456 and the data length of 1456 in S1350. That is, the sum of the initial offset of 100 and the cumulative offset of 4, in other words, the sum of 104 is subtracted from the sequence number. The data length difference of 4 is subtracted from the data length.

Similarly, when the switch 1010 receives the frame having the sequence number of 3020 and the data length of 1460 in S1370, the switch 1010 rewrites this frame to a frame having the sequence number of 2912 and the data length of 1456 in S1380. That is, the sum of the initial offset of 100 and a value obtained by multiplying the cumulative offset of 4 by two, in other words, the sum of 108 is subtracted from the sequence number. The data length difference of 4 is subtracted from the data length. The frame is received in S1380, and the cumulate value of the data amount matches the data total length. Therefore, the switch 1010 recognizes that the reception of the large data has been completed.

The switch 1010 rewrites the frame as described above in S1320, S1350, and S1380, and additionally describes information before and after the rewriting in the sequence ring table 1015. That is, in S1320, the switch 1010 describes the sequence number of 100 before the rewriting as the reception sequence number and the sequence number of 0 as the transmission sequence number in the sequence ring table 1015. Further, the switch 1010 respectively describes a value of 104 obtained by adding the initial offset of 100 to the cumulative offset of 4 as the sequence number offset, the sequence number of 1560 of the transmission frame as the transmission ACK number, and the sequence number of 1456 of the reception frame as the reception ACK number in the sequence ring table 1015.

At this time, the previous transmission index is set to the position of the frame, and the ACK index is set to the initial position. The initial position is at a position immediately before the frame. In the example shown in FIG. 26, the initial position is at the lowest row in the sequence ring table 1015.

When the reception frame is the head division data of the large data, the switch 1010 sets the head flag at the position of the corresponding frame. Here, as shown in FIG. 26, the switch 1010 sets the head flag at the position of the frame received in S1320.

The switch 1010 performs the description in the sequence ring table 1015 in S1350 and S1380 similarly to S1320. At this time, the previous transmission index is set to a position of a newly described frame, and the ACK index and the head flag are not updated.

In S1380, the switch 1010 recognizes that the reception of the large data has been completed. That is, the switch 1010 recognizes whether the data of 4380 bytes corresponding to the data total length of the large data has been received by using the sequence number. When the data total length matches the data length of the received data, the switch 1010 recognizes that the reception of the large data has been completed. The switch 1010 sets the end flag at the position of the corresponding frame.

In S1330, S1360, and S1390, the switch 1010 transmits the frames on which the destination conversion and the sequence number conversion are performed to the ECU 1031, When receiving these frames from the switch 1010, the ECU 1031 returns the ACK each time. The switch 1010 receives these ACKs in S1410, S1440, and S1470, respectively, and performs the destination conversion and the ACK number conversion in S1420, S1450, and S1480.

Specifically, the switch 1010 receives the ACK having the ACK number of 1456 for the frame having the sequence number of 0 in S1410. In S1420, as the destination conversion, the switch 1010 changes the destination address from the switch 1010 to the ECU 1031 and changes the transmission source address from the tool 1020 to the switch 1010, in accordance with the connection tunnel configuration. The switch 1010 rewrites this ACK to an ACK of 1560 obtained by adding the initial offset of 100 and a value of 4 obtained by multiplying the cumulative offset of 4 by one to the ACK number of 1456.

The switch 1010 receives the ACK having the ACK number of 2912 for the frame having the sequence number of 1457 in S1440. In S1450, the switch 1010 rewrites this ACK to an ACK of 3020 obtained by adding the initial offset of 100 and a value of 8 obtained by multiplying the cumulative offset of 4 by two to the ACK number of 2912.

The switch 1010 receives the ACK having the ACK number of 4368 for the frame having the sequence number of 2912 in S1470. In S1480, the switch 1010 rewrites this ACK to an ACK of 4480 obtained by adding the initial offset of 100 and a value of 12 obtained by multiplying the cumulative offset of 4 by three to the ACK number of 4368.

In S1420, S1450, and S1480, the switch 1010 updates the sequence ring table 1015 in addition to the destination conversion and the ACK number conversion described above. Specifically, in S1420, the switch 1010 moves the ACK index to the position of the description in accordance with the ACK number of 1456 received in S1410 in the sequence ring table 1015. In S1450, the switch 1010 moves the ACK index to the position of the description in accordance with the ACK number of 2912 received in S1440 in the sequence ring table 1015, In S1480, the switch 1010 moves the ACK index to the position of the description in accordance with the ACK number of 4368 received in S1470 in the sequence ring table 1015.

Next, in S1430, S1460, and S1490, the switch 1010 transmits the ACK on which the destination conversion and the ACK number conversion are performed to the tool 1020. In this way, the frame is transmitted from the tool 1020 to the ECU 1031.

Next, the switch 1010 monitors whether the ACK index has caught up with the end flag. In the case of the present embodiment, in S1490, the switch 1010 recognizes that the ACK index has caught up with the end flag. In S1510, the switch 1010 transmits to the tool 1020, a diagnostic message positive ack indicating that the ACK index has caught up with the end flag. Next, in S1520, the switch 1010 updates a value of the sequence number offset between the ECU 1031 and the tool 1020, and ends the process.

[7-2-3. Process when Switch Cannot Receive ACK]

Next, an example in which the switch 1010 does not receive a part of the ACK transmitted from the ECU 1031 will be described with reference to a sequence diagram of FIG. 28. This example shows a case where the switch 1010 cannot receive the frame having the ACK number of 1456 to be received in S1410 and the frame having the ACK number of 2912 to be received in S1440.

Figure 28:
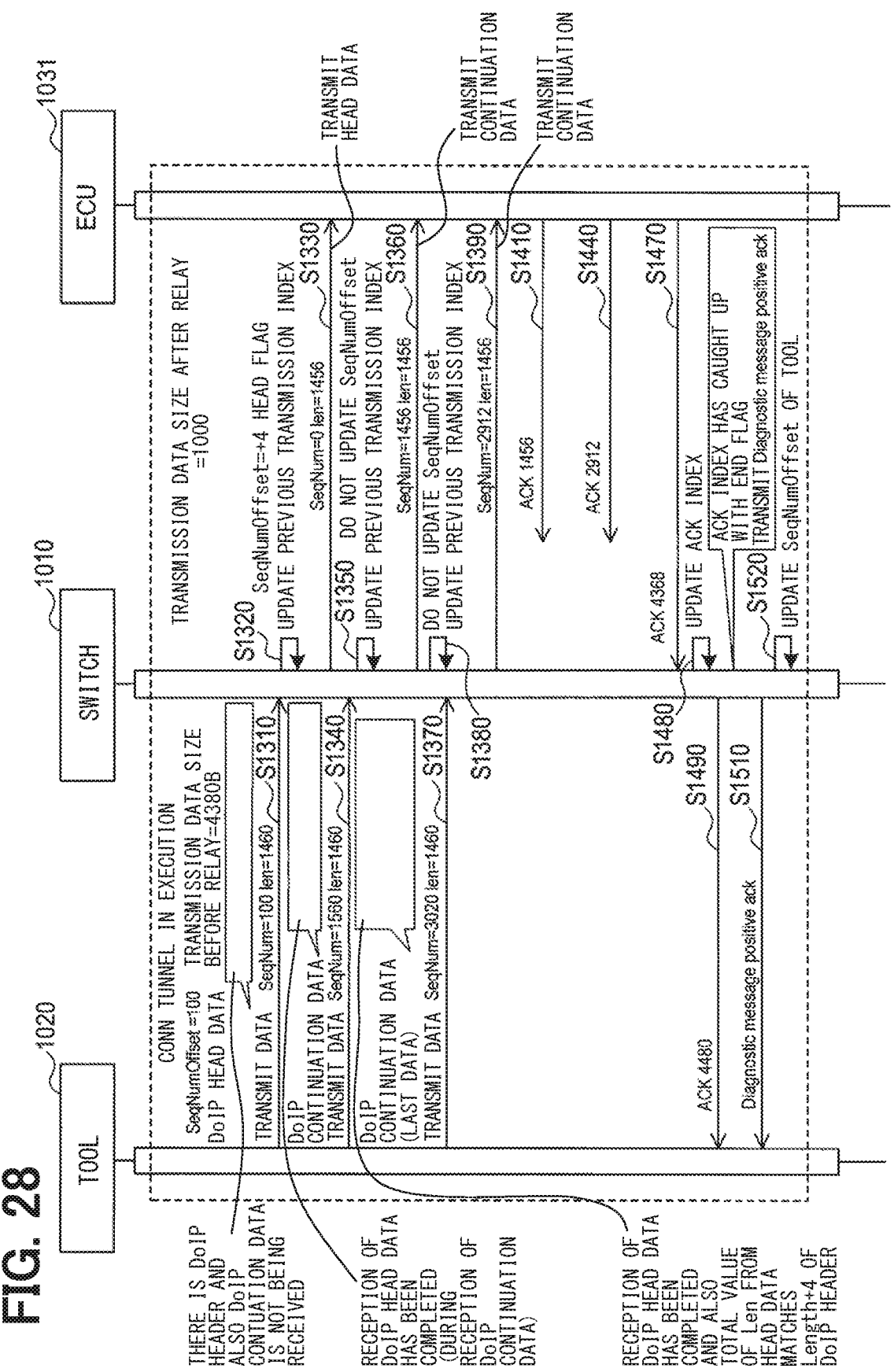
FIG. 28 is a sequence diagram showing one example of a process in a case where the switch does not receive a part of the ACK.

As shown in FIG. 28, the switch 1010 normally performs the processes of S1310 to S1390, and the ECU 1031 normally receives the frame from the switch 1010. Although the ECU 1031 transmits each ACK, the switch 1010 cannot receive the ACKs that correspond to the ACKs to be received in S1410 and S1440 and have the ACK numbers of 1456 and 2912.

However, the switch 1010 receives the ACK having the ACK number of 4368 in S1470, In S1480, the switch 1010 moves the ACK index to the position of the frame in accordance with the ACK number of 4368 in addition to the destination conversion and the ACK number conversion. Next, the switch 1010 transmits the ACK having the ACK number of 4480 to the tool 1020 in S1490.

In the description described above, the tool 1020 does not receive the ACK having the ACK number of 1560 and the ACK having the ACK number of 3020 to be received in S1430 and S1460. However, since the tool 1020 has been able to receive the ACK having the ACK number of 4480 larger than the ACK numbers of 1560 and 3020, the tool 1020 determines that the frame before the reception has been transmitted. Therefore, the retransmission of the frame is not performed. In this case, the previous transmission index has caught up with the ACK index, in other words, the transmission of all frames has been completed. However, when the tool 1020 has received the ACK having the ACK number of 3020 and has not receive the ACK having the ACK number of 4480 larger than the ACK number of 3020, the tool 1020 determines that this frame should be transmitted. Only the corresponding frame (the frame having the reception sequence number of 3020) is retransmitted.

[7-3. Effects]

According to the embodiment detailed above, the following effects may be provided.

(7a) According to one aspect of the present disclosure, the switch 1010 includes the multiple communication ports P1000 to P1004 connected to the tool 1020 and the ECUs 1031 to 1034, and relays the frame by the connection type communication in which the frame is received or transmitted between the multiple tools 1020 and the ECUs 1031 to 1034. The protocol performing the connection type communication is set to the connection protocol, and the protocol in the upper layer than the connection protocol is set to the upper layer protocol. The data that is divided in the upper layer protocol, transmitted, and received is set to the large data. The data obtained by dividing the large data is set to the division data.

The switch 1010 receives the reception frame from the communication ports connected to the tool 1020 and the ECUs 1031 to 1034 as the frame transmission source, and determines whether the reception frame is the division data by referring the header portion in the reception frame. When the reception frame is the division data, the switch 1010 recognizes the end point of the division data while comparing the data total length indicating the total data amount of the large data in the header portion of the reception frame with the data amount of the multiple received division data. The switch 1010 generates the transmission frame obtained by rewriting the header portion of the reception frame in accordance with a predetermined condition. The switch 1010 transmits the transmission frame from the communication ports connected to the tool 1020 as the transmission destination and the ECUs 1031 to 1034.

According to such a configuration, it may be possible to recognize whether the reception of the large data has been completed by comparing the total data amount with the data amount of the division data when relaying the division data obtained by dividing the large data. It may be possible to reduce the process load by the switch 1010 when relaying the frame including the description by the protocol in the upper layer than the protocol used for the connection type communication and also favorably perform the relay of the large data.

(7b) One aspect of the present disclosure further includes the sequence ring table 1015 capable of recording the head flag and the end flag. When starting the reception of the large data, the switch 1010 sets the head flag in the sequence ring table 1015. When completing the reception of the large data, the switch 1010 sets the end flag in the sequence ring table 1015.

According to such a configuration, it may be possible to manage whether the reception of the large data is completed by using the sequence ring table 1015 capable of recording the head flag and the end flag.

(7c) According to one aspect of the present disclosure, the sequence ring table 1015 is configured as the ring type record area.

According to such a configuration, it may be possible to set the record area between the head flag and the end flag as an overwritable area.

(7d) According to one aspect of the present disclosure, the switch 1010 further includes the memory 1012 that stores the connection tunnel table 1013. In the connection tunnel table 1013, the address of the communication device as the transmission destination is associated with the logical address indicating the address in the upper layer protocol and is associated with the MAC address or the IP address indicating the address in the connection protocol.

The header portion of the reception frame includes the destination address (for example, the MAC address) destined for the switch 1010 in the connection protocol, and the upper layer protocol (for example, the logical address in the upper layer header) destined for the communication device corresponding the transmission destination in the upper layer protocol.

The switch 1010 extracts the MAC address or the IP address in accordance with the logical address from the connection tunnel table 1013, and converts the destination address of the reception frame to the MAC address or the IP address in accordance with the logical address.

According to such a configuration, it may be possible to change the destination address to the communication device of the transmission destination with reference to the upper layer address of the reception frame. Therefore, it may be possible to reduce analysis load of the reception frame.

(7e) According to one aspect of the present disclosure, the switch 1010 communicates the frame by the connection type communication in which the sequence number and the ACK number is exchanged between the tool 1020 and the ECUs 1031 to 1034, When the difference of the amount of data communicated between the tool 1020 and the ECUs 1031 to 1034 occurs, the switch 1010 generates the transmission frame while correcting at least one of the sequence number or the ACK number of the reception frame in accordance with the difference of the data amount.

According to such a configuration, even when the amount of data communicated between the switch 1010, the tool 1020, and the ECUs 1031 to 1034 is different and the difference of the data amount occurs, it may be possible to perform the relay while favorably correcting the sequence number and the ACK number.

(7f) According to one aspect of the present disclosure, as a case where the difference of the data amount occurs, when the header of the upper layer protocol in the upper layer than the connection type communication is changed or deleted and thereby the frame size in the connection protocol by the connection type communication is changed, the switch 1010 generates the transmission frame while correcting the sequence number and the ACK number.

According to such a configuration, it may be possible to perform the relaying while favorably correcting the sequence number and the ACK number in the upper layer protocol.

(7g) According to one aspect of the present disclosure, the switch 1010 performs the connection establishment by the handshake between the tool 1020 and the ECUs 1031 to 1034 by proxy According to such a configuration, each communication device is able to perform the connection type communication with the destination or the transmission source by only establishing the connection with the switch 1010.

(7h) According to one aspect of the present disclosure, the switch 1010 includes the memory 1012 that records the ring type sequence ring table 1015 in which the past transmission reception sequence number, the ACK number, the previous transmission index, and the ACK index are described. The switch 1010 recognizes the difference of the data amount by referring the sequence ring table 1015. When generating the transmission frame, the switch 1010 rewrites the sequence ring table 1015.

According to such a configuration, it may be possible to manage the difference of the data amount between the switch 1010, the tool 1020, and the ECUs 1031 to 1034 by using the sequence ring table 1015. It may be possible to determine which frame has been transmitted to the ECUs 1031 to 1034 or which frame is necessary to be retransmitted by moving the previous transmission index and the ACK index. Therefore, it may be possible to improve communication reliability between the tool 1020 and the ECUs 1031 to 1034.

(7i) According to one aspect of the present disclosure, the TCP may be employed as the connection protocol. The DoIP may be employed as the upper layer protocol.

According to such a configuration, it may be possible to favorably relay the data in a configuration in which the protocol is converted between the TCP and the DoIP.

8. Other Embodiments

While the embodiments of the present disclosure has been described, the present disclosure is not limited to the embodiments described above and can be modified in various manners.

(8a) In the embodiments described above, the case where the number of communication lines connected to the switch 10 or the switch 1010 is five has been exemplified. However, the present disclosure is not limited to this. For example, the number of communication lines may be any number as long as it is two or more.

(8b) Multiple functions of one element in the described above embodiment may be implemented by multiple elements, or one function of one element may be implemented by multiple elements. Further, multiple functions of multiple elements may be implemented by one element, or one function implemented by multiple elements may be implemented by one element. In addition, a part of the configuration of the described above embodiment may be omitted. At least a part of the configuration of the above embodiments may be added to or replaced with another configuration of the above embodiments.

(8c) In addition to the relay apparatus such the switch 10 or the switch 1010 described above, various features such as a communication system having the relay apparatus as a component, a program for making a computer function as the delay apparatus, a non-transitory tangible storage medium such as a semiconductor memory in which the program is stored, and a method of relay may be provided to implement the present disclosure.

9. Correspondence Relation Between Configuration of Embodiments and Configuration of Present Disclosure The switch 1010 in the embodiments described above may correspond to the relay apparatus in the present disclosure. The tool 1020 and the ECUs 1031 to 1034 in the embodiments described above may correspond to the communication device in the present disclosure. The memory 1012 in the embodiments described above may correspond to a transfer destination recorder and a number recorder in the present disclosure. The connection tunnel table 1013 in the embodiments described above may correspond to the transfer destination information in the present disclosure. The sequence ring table 1015 may correspond to the sequence table in the present disclosure.

The communication by the TCP protocol in the embodiments described above may correspond to the connection type communication in the present disclosure. The configuration of S1115 executed by the switch 1010 in the embodiments described above may correspond to a data determiner in the present disclosure. In the embodiments described above, configurations of S1140, S1170, S1320, S1350, S1380, S1420, S1450, and S1480 may correspond to the rewriter in the present disclosure.

The configurations of S1150, S1180, S1230, and S1260 in the embodiments described above may correspond to the transmitter in the present disclosure. The configurations of S1110 and S1125 in the embodiments described above may correspond to the proxy portion in the present disclosure.

The controller and the method described in the present disclosure may be implemented by a special purpose computer which is configured with a memory and a processor programmed to execute one or more particular functions embodied in computer programs of the memory. Alternatively, the controller and the method described in the present disclosure may be implemented by a special purpose computer configured as a processor with one or more special purpose hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions being executed by a computer, in a tangible non-transitory computer-readable medium.

Here, the process of the flowchart or the flowchart described in the present disclosure includes multiple sections (or steps), and each section is expressed as, for example, S110. Further, each section may be divided into several subsections, while several sections may be combined into one section. Furthermore, each section thus configured may be referred to as a device, module, or means.

Although the present disclosure is described based on the above embodiments, the present disclosure is not limited to the embodiments and the structures. The present disclosure encompasses various modifications and variations within the scope of equivalents. Furthermore, various combinations and formations, and other combinations and formations including one or more than one or less than one element may be included in the scope and the spirit of the present disclosure.

The invention claimed is:

1. A relay apparatus configured to receive a reception frame and transmit a transmission frame by connection type communication in which the transmission frame is transmitted and the reception frame is received between a plurality of communication devices, comprising:
a plurality of communication ports each of which is connected to one of the plurality of communication devices;
a type determiner configured to
receive the reception frame from a communication port among the plurality of communication ports,
the communication port being connected to a communication device as a frame transmission source among the plurality of communication devices, and
determine a type of the reception frame by referring to a header portion of the reception frame;
a rewriter configured to generate the transmission frame obtained by rewriting the header portion of the reception frame in accordance with a predetermined condition when the type of the reception frame corresponds to a predetermined type; and
a transmitter configured to transmit the transmission frame from a communication port connected to a communication device as a transmission destination among the plurality of communication ports;
a transfer destination recorder configured to record transfer destination information regarding an address of the communication device as the transmission destination,
wherein in the transfer destination information, a first address indicating an address in an upper layer protocol is associated with a second address indicating an address in a connection protocol,
a protocol performing the connection type communication is set to the connection protocol,
a protocol in an upper layer compared with the connection protocol is set to the upper layer protocol,
the header portion of the reception frame includes
a destination address destined for the relay apparatus in the connection protocol, and
an upper layer address destined for the communication device in the upper layer protocol, and
the rewriter is configured to
extract the second address in accordance with the first address from the first address matching the upper layer address, and
convert the destination address of the reception frame to the extracted second address.

2. The relay apparatus according to claim 1,
wherein the relay apparatus is configured to
receive the reception frame and
transmit the transmission frame by the connection type communication that exchanges a sequence number and an ACK number between the relay apparatus and each of the plurality of communication devices, and
the rewriter is configured to
generate the transmission frame while performing correction of at least one of the sequence number or the ACK number in the reception frame in accordance with a difference of a data amount between the relay apparatus and one of the plurality of communication devices in a case where the difference occurs.

3. The relay apparatus according to claim 2,
wherein the case where the difference occurs includes a case where a prior communication other than communication for a relay target occurs, and
in the case where the prior communication occurs,
the rewriter is configured to generate the transmission frame while performing the correction in accordance with the data amount of the prior communication.

4. The relay apparatus according to claim 2,
wherein the case where the difference of the data amount occurs includes
a case
where a frame size is changed in the connection protocol by the connection type communication due to change or deletion of a header of an upper layer protocol in an upper layer than the connection type communication, and
in the case
where the frame size is changed in the connection protocol by the connection type communication due to the change or
the deletion of the header of the upper layer protocol in the upper layer than the connection type communication,
the rewriter is configured to generate the transmission frame while calculating a data size difference between the reception frame and the transmission frame and performing the correction.

5. The relay apparatus according to claim 2, further comprising:
a number recorder configured to record a sequence table in which
a previous transmission reception sequence number,
an ACK number,
a transmission index, and
an ACK index are described,
wherein the rewriter is configured to
recognize a difference of the data amount by referring to the sequence table, and
rewrite the sequence table when generating the transmission frame.

6. The relay apparatus according to claim 5,
wherein the plurality of communication ports include three transfer destination ports or more,
the number recorder includes the sequence table for each of the transfer destination ports,
the rewriter is configured to rewrite the sequence table for each of the transfer destination ports.

7. The relay apparatus according to claim 1, further comprising:
a proxy portion configured to establish connection by handshake with the plurality of communication devices by proxy.

8. A relay apparatus configured to receive a reception frame and transmit a transmission frame by connection type communication in which the transmission frame is transmitted and the reception frame is received between a plurality of communication devices, comprising:
a plurality of communication ports each of which is connected to one of the plurality of communication devices;
a processor configured to
receive the reception frame from a communication port among the plurality of communication ports,
the communication port being connected to a communication device as a frame transmission source among the plurality of communication devices,
determine whether the reception frame corresponds to division data by referring to a header portion of the reception frame,
the division data is being obtained by dividing non-divided data corresponding to data to be divided in an upper layer protocol, transmitted, and received, and
generate the transmission frame obtained by
rewriting the header portion of the reception frame in accordance with a predetermined condition while comparing a data total length indicating non-divided data in the header portion of the reception frame with a data amount of the division data, when the reception frame corresponds to the division data; and
a transmitter configured to transmit the transmission frame from the communication port connected to a communication device as a transmission destination among the plurality of communication devices,
wherein a protocol performing the connection type communication is set to a connection protocol, and
a protocol in an upper layer than the connection protocol is set to the upper layer protocol.

9. The relay apparatus according to claim 8, further comprising:
a management table configured to record
a head flag and
an end flag,
wherein the processor is configured to set the head flag in the management table when reception of the non-divided data starts, and
the processor is configured to set the end flag in the management table when the reception of the non-divided data is completed.

10. The relay apparatus according to claim 9,
wherein the management table is configured as a ring type record area.

11. The relay apparatus according to claim 8, further comprising:
a memory configured to record transfer destination information regarding an address of the communication device as the transmission destination,
wherein
in the transfer destination information, a first address indicating an address in the upper layer protocol is associated with a second address indicating an address in the connection protocol,
the header portion of the reception frame includes a destination address destined for the relay apparatus in the connection protocol, and
an upper layer address destined for the communication device in the upper layer protocol, and
the processor is configured to
extract the second address in accordance with the first address from the first address matching the upper layer address, and
convert the destination address of the reception frame to the extracted second address.

12. The relay apparatus according to claim 8,
wherein the relay apparatus is configured to
receive the reception frame and
transmit the transmission frame by the connection type communication that exchanges a sequence number and an ACK number with each of the plurality of communication devices, and
the processor is configured to
generate the transmission frame while performing correction of at least one of the sequence number or the ACK number in the reception frame in accordance with a difference of a data amount between two communication devices of the plurality of communication devices in a case where the difference occurs.

13. The relay apparatus according to claim 12,
wherein the case where the difference occurs includes a case where a prior communication other than communication for a relay target occurs, and
in the case where the prior communication occurs, the processor is configured to generate the transmission frame while performing the correction in accordance with the data amount of the prior communication.

14. The relay apparatus according to claim 8,
wherein the case where the difference of the data amount occurs includes
a case
where a frame size is changed in the connection protocol by the connection type communication due to change or deletion of a header of the upper layer protocol in the upper layer compared with the connection type communication, and
in the case
where the frame size is changed in the connection protocol by the connection type communication due to the change or the deletion of the header of the upper layer protocol in the upper layer compared with the connection type communication,
the processor is configured to generate the transmission frame while calculating a data size difference between the reception frame and the transmission frame and performing the correction.

15. The relay apparatus according to claim 8, further comprising:
- a memory configured to record
  - a sequence table in which a previous transmission reception sequence number,
  - an ACK number,
  - a transmission index, and
  - an ACK index are described,
- wherein the processor is configured to recognize a difference of the data amount by referring to the sequence table, and rewrite the sequence table when generating the transmission frame.

16. The relay apparatus according to claim 8, further comprising:
- a proxy processor configured to establish connection by handshake with the plurality of communication devices by proxy.

17. The relay apparatus according to claim 8,
- wherein a transmission control protocol (TCP) is employed as the connection protocol, and
- a diagnostics over internet protocol (DoIP) is employed as the upper layer protocol.

18. A relay apparatus configured to receive a reception frame and transmit a transmission frame by connection type communication in which the transmission frame is transmitted and the reception frame is received between a plurality of communication devices, comprising:
- a plurality of communication ports each of which is connected to one of the plurality of communication devices;
- a processor configured to
  - receive the reception frame from a communication port among the plurality of communication ports,
  - the communication port being connected to a communication device as a frame transmission source among the plurality of communication devices,
  - perform determination of the reception frame by referring to a header portion of the reception frame, and
  - generate the transmission frame obtained by rewriting the header portion of the reception frame in accordance with a predetermined condition; and
- a transmitter configured to transmit the transmission frame from a communication port connected to a communication device as a transmission destination among the plurality of communication ports; and
- a memory configured to record transfer destination information regarding an address of the communication device as the transmission destination,
- wherein
- in the transfer destination information, a first address indicating an address in an upper layer protocol is associated with a second address indicating an address in a connection protocol,
- a protocol performing the connection type communication is set to the connection protocol,
- a protocol in an upper layer compared with the connection protocol is set to the upper layer protocol,
- the header portion of the reception frame includes a destination address destined for the relay apparatus in the connection protocol, and an upper layer address destined for the communication device in the upper layer protocol, and
- the processor is configured to
  - extract the second address in accordance with the first address from the first address matching the upper layer address, and
  - convert the destination address of the reception frame to the extracted second address.

* * * * *